United States Patent
Narinen

(10) Patent No.: US 9,731,642 B2
(45) Date of Patent: Aug. 15, 2017

(54) INTERCHANGEABLE PLATFORM AND A MEANS FOR TRANSPORTING AN INTERCHANGEABLE PLATFORM

(71) Applicant: Rangero Oy, Sastamala (FI)

(72) Inventor: Seppo Narinen, Sastamala (FI)

(73) Assignee: Rangero Oy, Sastamala (FI)

( * ) Notice: Subject to any disclaimer, the term of this patent is extended or adjusted under 35 U.S.C. 154(b) by 0 days.

(21) Appl. No.: 14/404,489

(22) PCT Filed: May 30, 2013

(86) PCT No.: PCT/FI2013/050587
§ 371 (c)(1),
(2) Date: Nov. 28, 2014

(87) PCT Pub. No.: WO2013/178883
PCT Pub. Date: Dec. 5, 2013

(65) Prior Publication Data
US 2015/0110590 A1 Apr. 23, 2015

(30) Foreign Application Priority Data

May 30, 2012 (FI) ..................................... 20125584
May 30, 2012 (FI) ..................................... 20125585

(51) Int. Cl.
*B60P 1/64* (2006.01)
*B62D 63/06* (2006.01)
(Continued)

(52) U.S. Cl.
CPC .................. *B60P 1/64* (2013.01); *B60P 1/04* (2013.01); *B60P 3/122* (2013.01); *B62D 63/061* (2013.01); *B62D 63/08* (2013.01)

(58) Field of Classification Search
CPC .... B60P 1/64; B60P 1/04; B60P 3/122; B62D 63/08; B62D 63/061
See application file for complete search history.

(56) References Cited

U.S. PATENT DOCUMENTS

| 613,198 A | 10/1898 | Hall |
| 1,562,364 A | 11/1925 | Reasoner |

(Continued)

FOREIGN PATENT DOCUMENTS

| CA | 1040229 A | 10/1978 |
| DE | 3635537 A1 | 4/1988 |

(Continued)

OTHER PUBLICATIONS

International Search Report; mailed Nov. 15, 2013; PCT/FI2013/050587.

(Continued)

*Primary Examiner* — Kaitlin Joerger
(74) *Attorney, Agent, or Firm* — Ziegler IP Law Group, LLC

(57) ABSTRACT

An interchangeable platform that encompasses side beams at the sides and at least one support structure, with what the side beams are fastened to each other. Side beams are into sideways direction, perpendicular to the longitudinal direction, at least partially open and closed from up and down and they have an upside-down G-profile. An interchangeable platform encompasses at least one longitudinal guide. The interchangeable platform can be guided by the guide to the transport device, can be locked by side beams to the transport device and load fastening equipment can be fastened to side beams. Additionally a transport device that encompasses side guides.

16 Claims, 15 Drawing Sheets

(51) Int. Cl.
   *B60P 3/12* (2006.01)
   *B60P 1/04* (2006.01)
   *B62D 63/08* (2006.01)

(56) References Cited

U.S. PATENT DOCUMENTS

| | | | |
|---|---|---|---|
| 1,567,478 A | | 12/1925 | Vonnez et al. |
| 2,630,329 A | | 3/1953 | Ryan |
| 3,107,801 A | * | 10/1963 | Blonsky ............... B60P 1/04 414/474 |
| 3,342,508 A | * | 9/1967 | Thomas ............... B60P 3/1033 280/414.1 |
| 3,624,786 A | * | 11/1971 | Lundahl ............... B60P 1/04 280/149.2 |
| 3,977,726 A | * | 8/1976 | Prestayko ............ B60P 1/04 298/21 V |
| 4,203,697 A | * | 5/1980 | Cayton ................ B60P 1/64 280/79.11 |
| 4,231,695 A | * | 11/1980 | Weston, Sr. ......... B60P 1/52 277/590 |
| 4,685,855 A | * | 8/1987 | Celli .................... B62D 63/061 254/10 R |
| 4,930,799 A | * | 6/1990 | Pihlstrom ........... B62D 63/061 280/400 |
| 5,447,361 A | * | 9/1995 | Phillips ............... B60P 1/12 298/1 A |
| 5,556,249 A | * | 9/1996 | Heine .................. B60P 1/6454 414/477 |
| 5,639,207 A | | 6/1997 | Green |
| 5,755,549 A | * | 5/1998 | Ogrodnick .......... B60P 3/122 414/500 |
| 5,941,676 A | | 8/1999 | Garcia |
| 6,250,872 B1 | * | 6/2001 | Rahijarvi ............ B60P 1/04 280/414.1 |
| 6,527,494 B2 | * | 3/2003 | Hurlburt ............. B62D 63/061 298/17.5 |
| 6,964,427 B2 | * | 11/2005 | Chumley ............ B60D 1/145 280/491.3 |
| 7,891,697 B1 | * | 2/2011 | Fahrbach ........... B62D 63/061 280/656 |
| 7,997,850 B2 | * | 8/2011 | Hutchison .......... B60P 3/07 414/478 |
| 2010/0021276 A1 | * | 1/2010 | Baughman .......... B60P 3/122 414/484 |
| 2010/0272549 A1 | * | 10/2010 | Petty .................. B60P 3/122 414/500 |
| 2011/0202199 A1 | * | 8/2011 | Crane ................. B60P 3/122 701/2 |

FOREIGN PATENT DOCUMENTS

| | | |
|---|---|---|
| DE | 102010056322 A1 | 12/2011 |
| EP | 0094280 A1 | 11/1983 |
| FR | 2332883 A1 | 6/1977 |
| GB | 158668 A | 2/1921 |
| KR | 20020075948 A | 10/2002 |
| LU | 32747 A | 7/1954 |
| SE | 154736 C | 3/1956 |
| SE | 446330 B | 9/1986 |
| WO | 8607019 A1 | 12/1986 |
| WO | 8804618 A1 | 6/1988 |
| WO | 9313958 A1 | 7/1993 |

OTHER PUBLICATIONS

Extended European Search Report for application No. 13797083.6-1757/2855202 PCT/FI2013/050587, mailed Apr. 11, 2016, 7 pages.
Office Action, Finland, Application No. 20125585, mailed May 17, 2013, 2 pages.

* cited by examiner

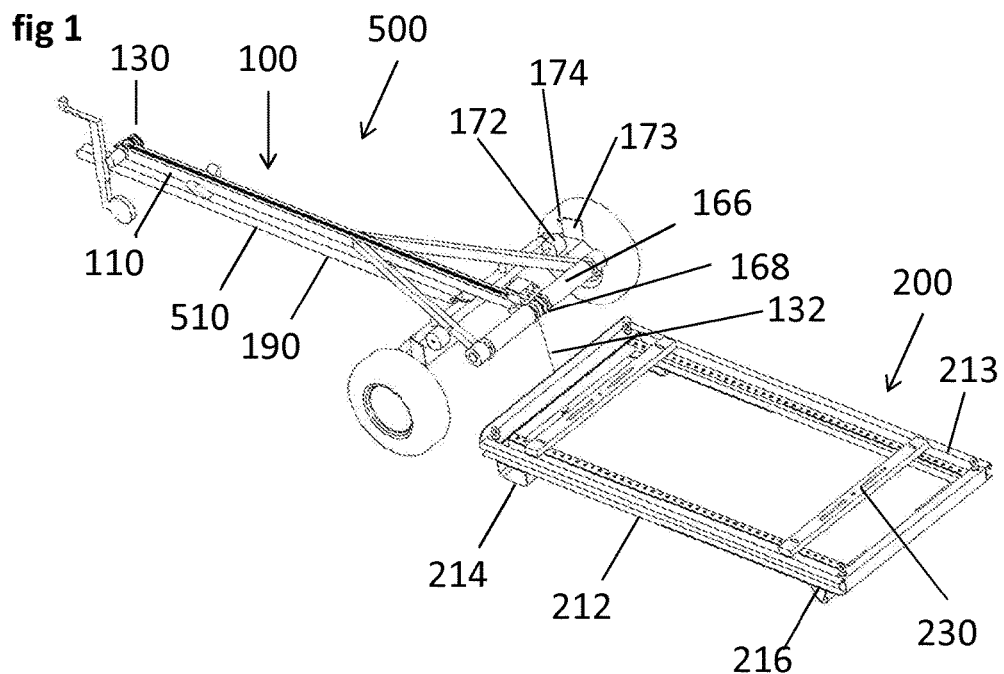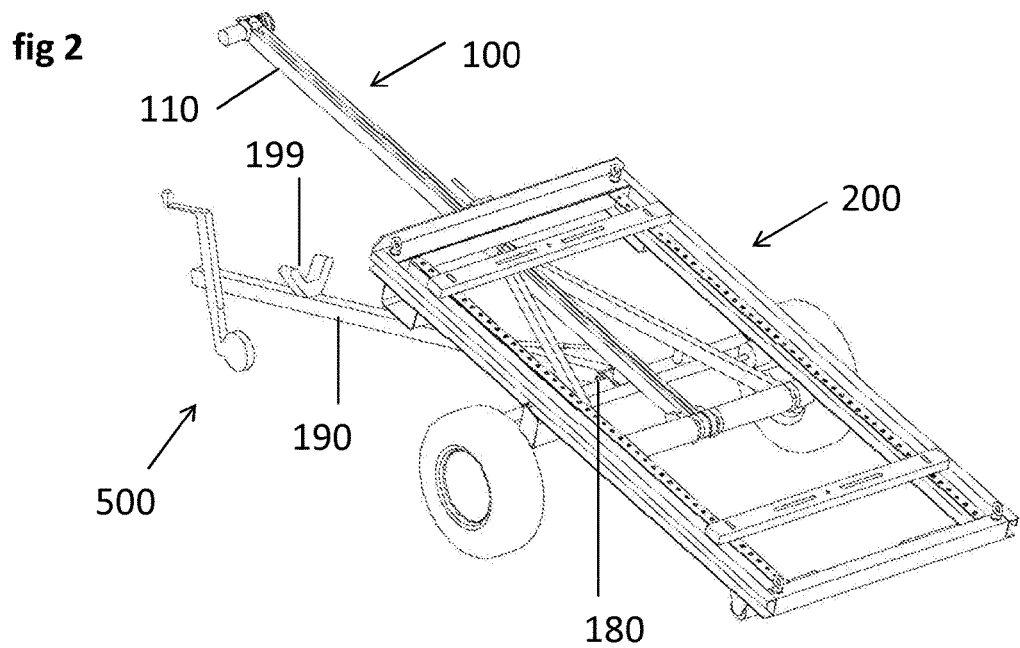

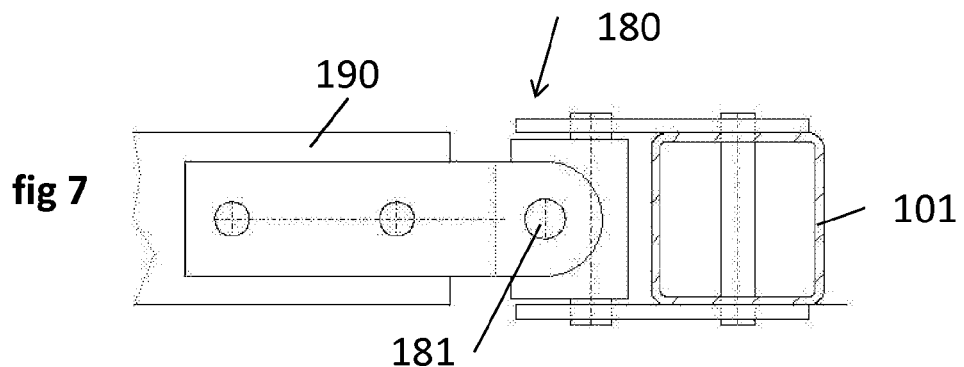
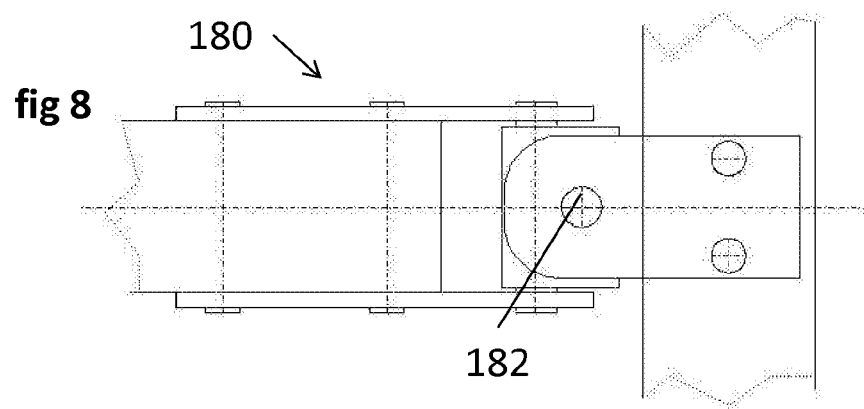
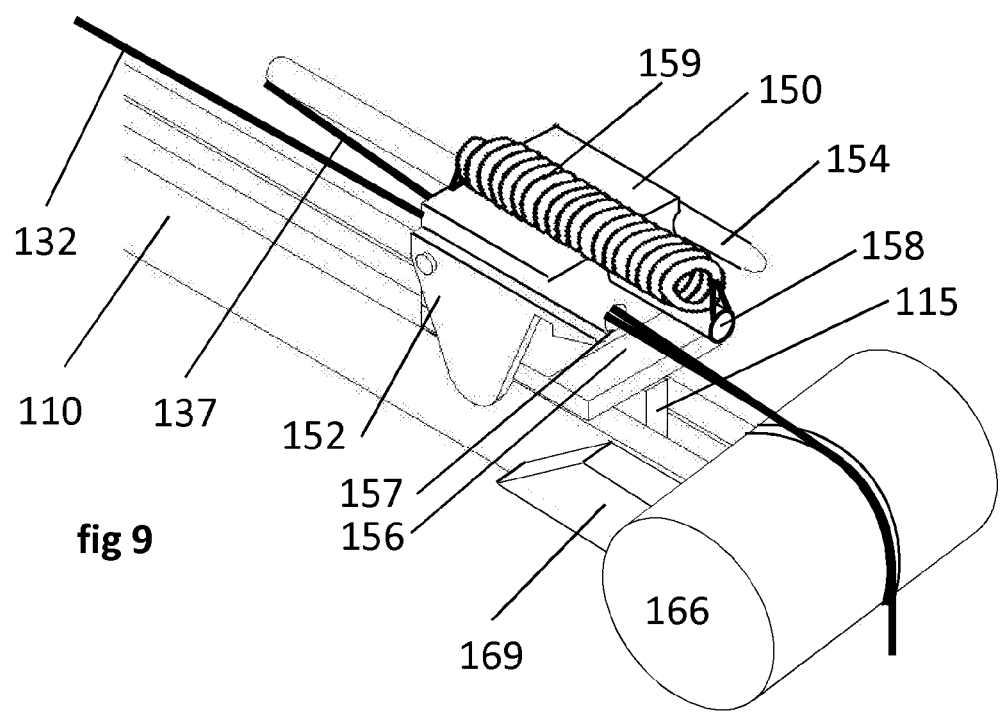

SEC B

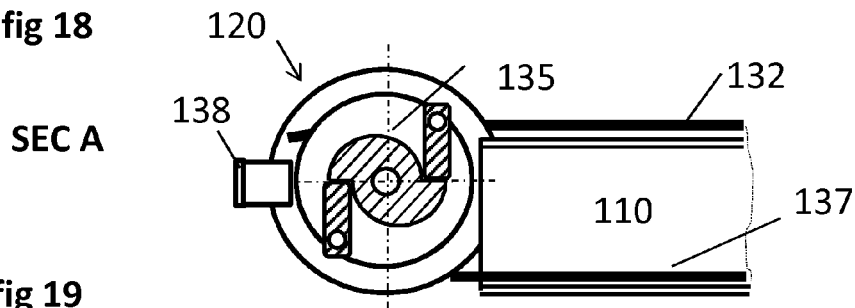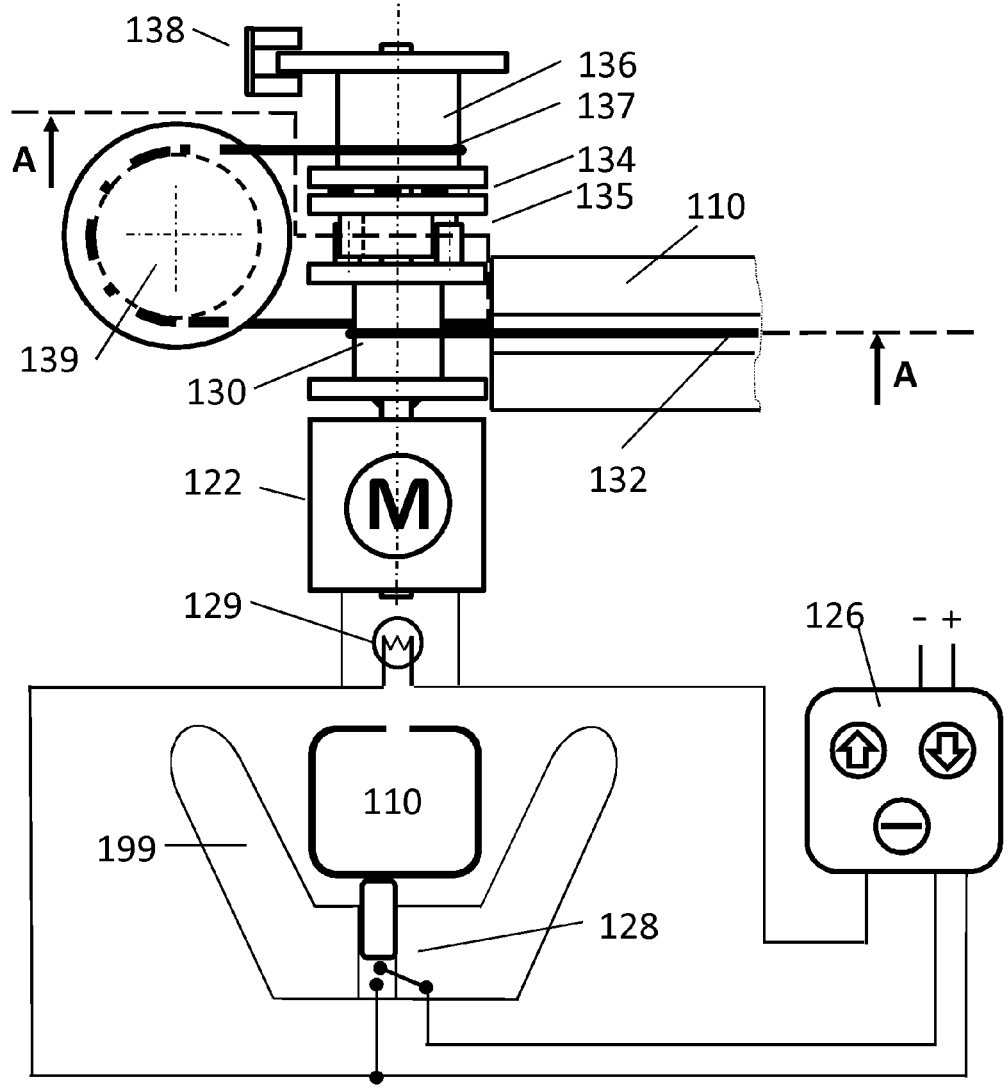

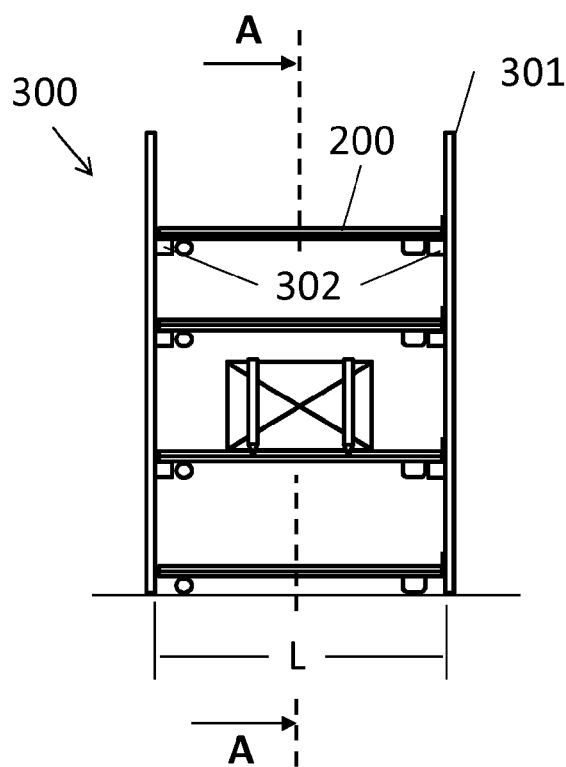
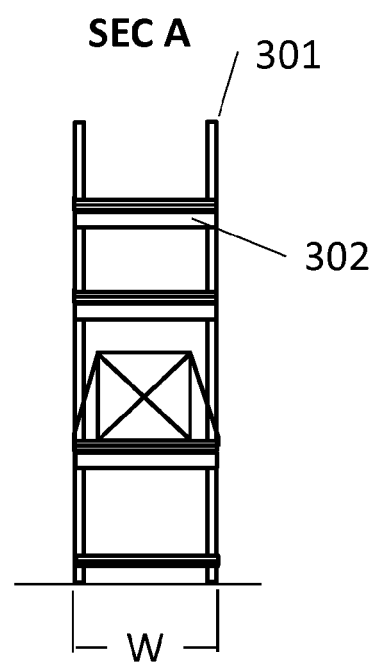
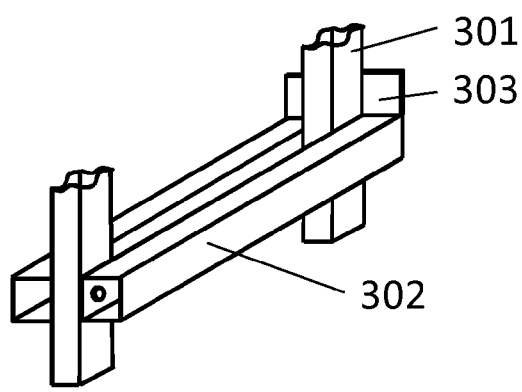

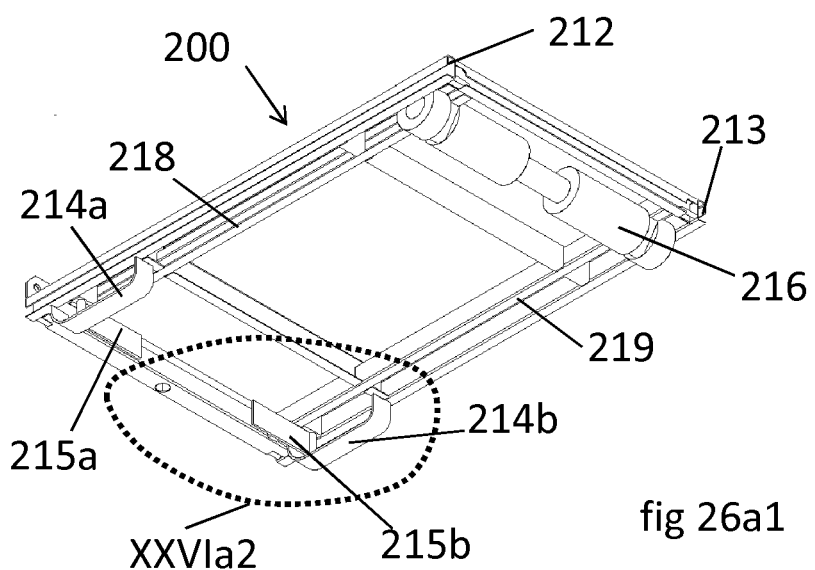
fig 26a1
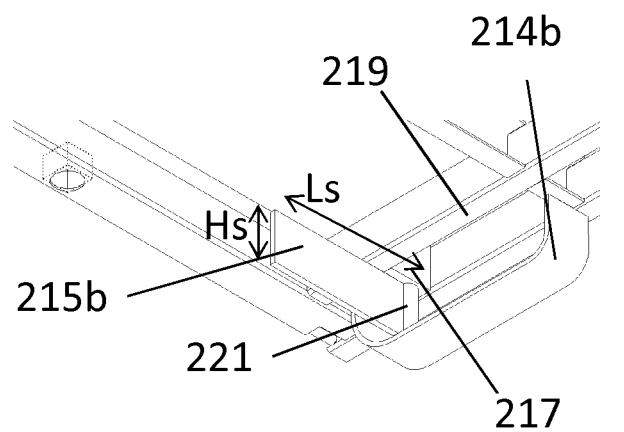
fig 26a2 though a utility trailer with or

INTERCHANGEABLE PLATFORM AND A MEANS FOR TRANSPORTING AN INTERCHANGEABLE PLATFORM

TARGET OF THE INVENTION

The invention is directed to a transport device, which includes a load management solution. The invention is directed additionally to an interchangeable platform. Furthermore the invention is directed to means of transport of the interchangeable platform.

BACKGROUND OF THE INVENTION

To transport goods a vehicle like a car, a van or a truck is often used. Additionally or alternatively a trailer with or without a load carrier section can be used. As a utility trailer, it is meant a towable device that includes a load carrier platform. A trailer means a towable device that does not include a fixed load carrier platform. It is known to exist utility trailers with a tilt to tilt the load carrier section. With the help of tilt a part of the utility trailer, as an example the load carrier section can be arranged at an angle to the ground, thus aiding the loading of the device with wheels. Additionally the tilt eases unloading of the load. The tilt causes that the load platform or corresponding other arrangement creates a support force to the load that is targeted perpendicular to the load carrying platform, essentially partly backwards. In this situation a tilted trailer is arranged to transfer the load backwards. The load can be loaded to the trailer for example by an interchangeable platform unit. Some of trucks are equipped with devices to load interchangeable platform units and some with hydraulic lifter devices. With the aid of a hydraulic lifter the load can be lifted and moved in relation to a transport device.

Specifically built utility trailers with or without hood can be used to transport or to store equipment. For example boats, jet skis, snow mobiles, motor cycles, ATV vehicles and/or stalls can be transported or stored. An utility trailer can be equipped with a tilt and winch, thus allowing even heavy equipment to be pulled on the trailer. It may be more difficult to unload the load from the trailer because the winch cannot be used for unloading.

Typically the load carrier section in the utility trailer is positioned between the wheels and vertically above the wheel axle. In this situation the load carrier is rather high, thus making the loading quite difficult. The load carrier size cannot be changed very much. The load can be bigger than the load carrier. As an example the front and/or the back panel can be opened to transport long load. The tow bar load should be according to the regulations. Within the known technology the tow bar load changes generally in relation to how the load happens to be set on the load carrier.

Solutions are known where separate load carrier is pulled to the transport device to transport the load. The load can be arranged on to the load carrier. In known solutions the loading of the transport vehicle necessitates that the transport vehicle is set parallel to the interchangeable platform, in other words, so that the load carrier is parallel to the load transport vehicle. Also the unloading of the interchangeable platform takes place parallel to the transport vehicle. In several known solutions the load carrier is unloaded from the transport vehicle by tilt mechanism as described earlier. In that scenario the load carrier is moved backwards off the transport vehicle by using tilt only so much that the edge of the load carrier hits the ground. After this the load transport device has to be moved out of the way to facilitate rest of the unloading.

SHORT SUMMARY OF THE INVENTION

One purpose of this invention is to ease cost and usability problems of some other solutions associated in storing, moving, loading and unloading of goods. One of the purposes of the invention is to lessen unnecessary damage to the goods. Purposes are achieved by universal and modular interchangeable platform solution. The interchangeable platform can be extended above the wheels, thus combining features of flatbed trailers and tipping trailers from the load management point of view. The load management can be done at own time while the interchangeable platform is on the ground.

The technical solution is based on the variability of interchangeable platforms and their transport devices in size, accessories and load carrying capability. Essentially the interchangeable platform in this invention is known for what is presented in the characterizing part of example B1. This kind of interchangeable platform transport vehicle is known for what is said in the examples. Technical features of interchangeable platform are presented in examples B1-B19. Technical features for interchangeable platform transport vehicle are presented additionally in examples B20-B24 and A1-A16.

The interchangeable platform can be fitted to a transport vehicle/device as it is presented later in examples B1-B19. The transport device can be fitted to the interchangeable platform as it is represented later in examples B20-B24.

Additionally other features of the transport device are presented in examples A1-A13. As an example with the aid of one specific transport device the interchangeable platform can be unloaded in a chosen direction without moving the towing vehicle itself, as an example backwards in reference to the towing vehicle.

The interchangeable platform can be fitted to be used as a storage shelf as it is presented in examples B14 and B16.

DESCRIPTION OF DRAWINGS

The invention is described more in depth by referencing to associated drawings, in which FIG. 1 represents an interchangeable platform 200 and its transport device 500, when the interchangeable platform 200 is not on its transport device 500, FIG. 2 represents one interchangeable platform 200 and its transport device 500, when the interchangeable platform 200 is being loaded on the transport device 500 or unloaded from the transport device 500, FIG. 7 represents a cross joint 180 from side, FIG. 8 represents a cross joint 180 from above, FIG. 9 represents one transport device arm 110 and a carrier 150 attached to it, FIG. 18 represents the winch 120 seen from the side in the cut off plane A-A In the figure FIG. 19 represents a winch 120 seen from above and the electrification system of the winch, FIG. 20 represents load carriers 200 supported by shelf holders seen from front FIG. 21 represents load carriers 200 supported by shelf holders seen from the side, FIG. 22 represents one part of the shelf ladder 301 and shelf bracket 302, FIGS. 26a1, 26a2 and 26b represent one arrangement of an interchangeable platform, that includes flaps 215a, 215b, that are in two different positions according to the use.

In the FIGS. 1-27b corresponding numbers or symbols are used for corresponding parts.

DETAILED DESCRIPTION OF THE INVENTION

Figure 3:
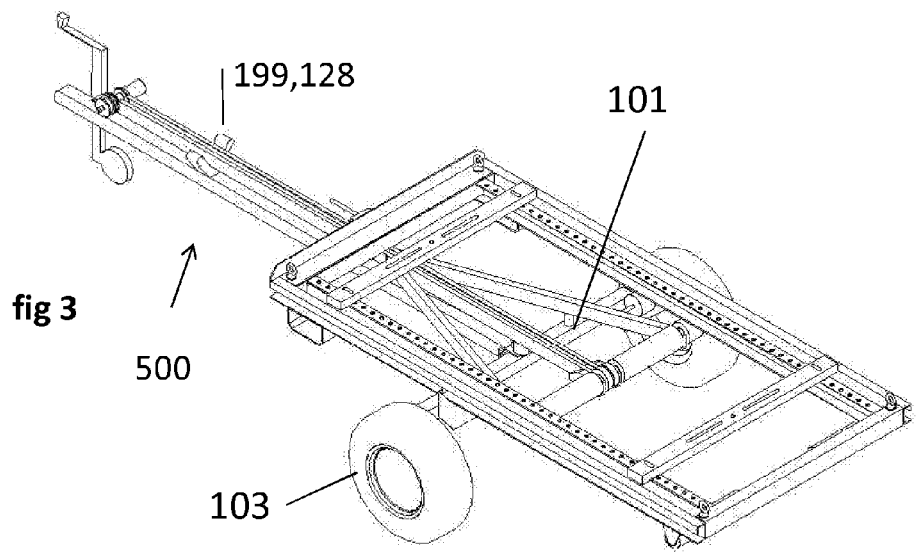
FIG. 3 represents one interchangeable platform 200 and its transport device 500, during transport.

One purpose of this invention is to ease cost and usability problems associated to the storing, moving, loading and unloading of goods. One of the purposes is to lessen unnecessary damage the goods. Purposes are achieved by universal and modular interchangeable platform solution. The interchangeable platform solution comprises at least one of the following

- interchangeable platform 200,
- loading and unloading device for interchangeable platform 100,
- transport device for interchangeable platform 500 and storage shelves 300, where the interchangeable platform can be used as a storage shelf.

Goods or equipment can be stored on an interchangeable platform 200. Optionally or additionally goods or equipment can be transported with interchangeable platform 200. Bare interchangeable platform or an interchangeable platform with goods or equipment can be transported with the transport device of an interchangeable platform. Bare interchangeable platform, bare interchangeable platforms, interchangeable platform and goods or equipment or interchangeable platforms on them can be stored on cabinet shelf brackets. Goods or equipment on an interchangeable platform 200 can be called as load. Advantageously aforementioned solution comprises of several interchangeable platforms 200 and transportation systems 500.

FIG. 1 represents one option for the transportation device 500 for the interchangeable platform and an interchangeable platform 200. The transportation device 500 includes a chassis 510 and an attached arm 110. Arm 110 length may depend somewhat on an application and the length on interchangeable platforms in use. The arm 110 length can be as an example at least 1.5 m and advantageously at least 2.5 m. The arm 110 length can be as an example at most 6 m. Transportation device 500 includes also loading reel and loading cable 132. By joining the loading cable 132 to the interchangeable platform 200 and reeling loading cable to the loading reel 130 can the interchangeable platform be pulled to its transportation device 500. The transportation device 500 includes additionally a roller 166. The roller comprises a groove 168 to guide the loading cable 132. The width of the guide groove can be as an example 10 mm. The roller 166 can be attached to the arm 110. The roller 166 can be supported by bearings, thus making the roller 166 to rotate. The roller may be a bit narrower than the interchangeable platform width. The roller 166 should be wide enough, thus facilitating interchangeable platform 200 loading and unloading, without making the interchangeable platform to tilt in cross direction. As an example the width of the roller can be over 800 mm. As an example the width of the roller can be 1000 mm. The roller can be made of one piece or it can be composed of several pieces.

FIG. 1 represents an interchangeable platform 200. The interchangeable platform 200 includes the first side beam 212 on the first side. The first side beam 212 defines one plane. The upper side of the side beam 212 is on that plane. The interchangeable platform includes another side beam 213 at opposite side that is arranged on that plane. Specifically the up side of the first side beam is arranged to the same plane with the first side beam. Thus the side beams 212 and 213 define the longitudinal direction for the interchangeable platform 200. In the FIG. 1 the side beams are parallel, thus the longitudinal direction of the interchangeable platform is essentially parallel to the direction of side beams 212 and 213. Side beams are not necessarily parallel. Thus the longitudinal direction of the interchangeable platform 200 stays in between the angle of side beams 212 and 213. The purpose of the side beams is to guide the interchangeable platform to its transportation device 500. For this reason, the first side beam forms an angle with longitudinal direction, that is less than 30 degrees and the other side beam 213 forms an angle with longitudinal direction, that is less than 30 degrees. The interchangeable platform 200 includes additionally at least one support structure 230 that connects the first side beam 212 and the second side beam 213 together. Advantageously side beams 212, 213 comprises parallel parts. With the aid of parallel parts the interchangeable platform 200 can be guided to and locked on its transportation device 500. As an example In the FIG. 24 there is an interchangeable platform that comprises of parallel side beams 212, 213 and a narrowing front section 240. It could be possible to think that the side beams in the figure would not be straight but forms parallel parts (In the FIG. 24 the parallel parts would be the side beams 212, 213).

Parallel parts of side beams 212, 213 define a longitudinal direction for interchangeable platform 200 that is parallel to parallel parts of side beams 212, 213. Parallel parts of side beams are opposite to each other in longitude or at least partly opposite to each other, thus interchangeable platform is steerable and attachable to its transport device 500 using these opposite to each other parallel parts. Parallel parts are at least partially opposite to each other, if there exists a direction perpendicular to longitudinal direction that crosses the first side beam 212 and the second side beam 213 in a right angle.

The chassis of an interchangeable platform 200 can be built using profiles and the chassis can form a closed form. Parallel side beams can be at 600 mm-2400 mm distance from each other, advantageously 1000 mm-1500 mm and optimally 1200 mm-1220 mm. The width of a changeable load carrier is thus combined side beam width more than that distance. The combined width of side beams can be as an example about 50 mm-200 mm. If the side beams are not parallel, then the biggest distance can have afore mentioned values. The width of a interchangeable platform can thus be between 650 mm-2600 mm. Side beams 212, 213 and possibly the front section 240 (FIG. 24) define the length of a interchangeable platform. The length of an interchangeable platform can be as an example 2 m-11 m and advantageously 2 m-5 m. In one form the length of an interchangeable platform 200 is 3200 mm, thus making interchangeable platform well suitable for private use, as an example together with a transportation vehicle 500 in the FIG. 1. In another form the length of an interchangeable platform 200 is about 2400 mm, thus allowing an interchangeable platform 200 to be fitted by length as an interchangeable platform in standard length trucks. In this example the interchangeable platform can be loaded into a truck crosswise thus avoiding waste space in the truck bed. The length of interchangeable platform is defined by the length of side beams, and the length of side beams can be defined for example in 800 mm steps. Thus the length of an interchangeable platform can be as an example 4000 mm or 1600 mm. Length of an interchangeable platform effects on the arm 110 length of the transportation device 500. Like it is presented later, the length of a interchangeable platform is affected as an example by the shape of the interchangeable platform; as an example whether there is a front section 240 or not.

The front section 240 can be a module that is removable from the chassis of the interchangeable platform 200. Front section 240 can be a module that can be attached to the interchangeable platform 200 or to the chassis. The chassis of the interchangeable platform comprise s at least side beams 212, 213 and a support structure 230 to join the side beams together. The chassis of an interchangeable platform 200 is essentially the part that does not include the front section 240. The front section 240 can be equipped with accessories, like a separate winch to pull the load to the interchangeable platform 200. As an example with the aid of a separate winch a boat can be pulled to the interchangeable platform. With the aid of loading and unloading device 100 and associated winch 120 the interchangeable platform and the load can be pulled onto the transportation device 500. The front section can optionally contain also or as an option, guides like guiding rolls to guide the load, like a boat, onto the interchangeable platform.

The length of an interchangeable platform can be fitted as needed with at least one extension module. With the aid on extension module the length of side beams 212 and 213 of an interchangeable platform 200, thus allowing length adjustment according to the need. With the aid of extension module, guides 218 of an interchangeable platform 200 can be lengthened. An extension module may include supports so that by using one module, at least one of the following can be lengthened the first side beam, the second side beam, first guide and second guide. At simplest with one extension module only one of following can be lengthened: the first side beam, the second side beam, first guide and second guide. Thus depending on the arrangement two or four extension modules may be needed. The length of an extension module can be as an example 800 mm. The extension module or modules can be advantageously be placed in front stands like skids 214. It is also possible to place extension modules in between skids 214 and wheel, roller or roll 216. Advantageously the extension module is not placed back of wheel, roller or roll 216, because in this case in loading and unloading, when the front part of an interchangeable platform is lifted off the ground the wheel, roller or roll 216 does not touch the ground.

In the FIG. 1 the first side beam 212 is at least partly open and closed from up or down. The opening is sidewise perpendicular to the longitudinal direction of the interchangeable platform and is in opposite direction with the opening in the other side beam 213. The other side beam 213 has an opening sidewise perpendicular to the longitudinal direction of the interchangeable platform and is in opposite direction with the opening in the other side beam 212. When side beams are arranged as described earlier, at least partly open, it is possible to fit a guide 174 to the open channel, that is arranged to guide the interchangeable platform in its transport device 500, when the interchangeable platform is being pulled on to the transport device 500 or is being pulled off the transport device. Additionally the guide 174 can support the interchangeable platform during transport. This is illustrated In the FIG. 15. Additionally, when the side beams are as described earlier, closed above and down, it is possible to attach fastening straps to the side beams 212 and 213. This is illustrated as an example In the FIG. 23. Additionally or as an option the side guide 173 may are arranged to guide the interchangeable platform 200 to the transport device 500.

In the FIG. 1 the first side beam 212 is parallel with the longitudinal direction of the interchangeable platform 200. Additionally the other side beam 213 is parallel with the longitudinal direction of the interchangeable platform 200.

In the FIG. 1 into the first end of the interchangeable platform is arranged a fastening apparatus to attach the loading cable 132 to the interchangeable platform 200. The interchangeable platform includes also a wheel, roll or roller 216 that is arranged to the second head side from the midpoint in longitudinal direction opposite to the first head and underside of the interchangeable platform 200. Thus making it possible to move the interchangeable platform 200 with the aid of mentioned wheel, roll or roller 216.

The interchangeable platform 200 In the FIG. 1 includes also a first stand, a skid 214 at the position under the first outer side edge of an interchangeable platform 200, and also another stand, second skid 214 at the position under the second outer side edge of interchangeable platform 200 so that the skids 214 are arranged to the first head side from the midpoint in longitudinal direction of the interchangeable platform. The length of stands is arranged so that when the interchangeable platform 200 is on level base then the upside of the interchangeable platform 200 is essentially level. As stands in place or in addition to skids also wheels can be used. The length of stands (height) can be as an example 50 mm-200 mm; advantageously 80 mm-150 mm and optimally 100 mm. Here the length of stands alias height means the distance of a level underside of the load carrier from the ground when the interchangeable platform is on level base. If there are several of those distances (the load carrier is sloping) then the distance is from the underside of the load carried to the ground at the point of load carrier foot. The length of the stand is as an example at least 50 mm, so that a fastening apparatus, like a ball 133 is easily attachable and detachable to and from the interchangeable platform. The length of the stand is as an example at least 80 mm, so that a lifter fork fits under the interchangeable platform. This kind of interchangeable platform can be managed by a forklift. The length of skids may be affected by the diameter of a wheel, roll or roller 216.

Figure 11:
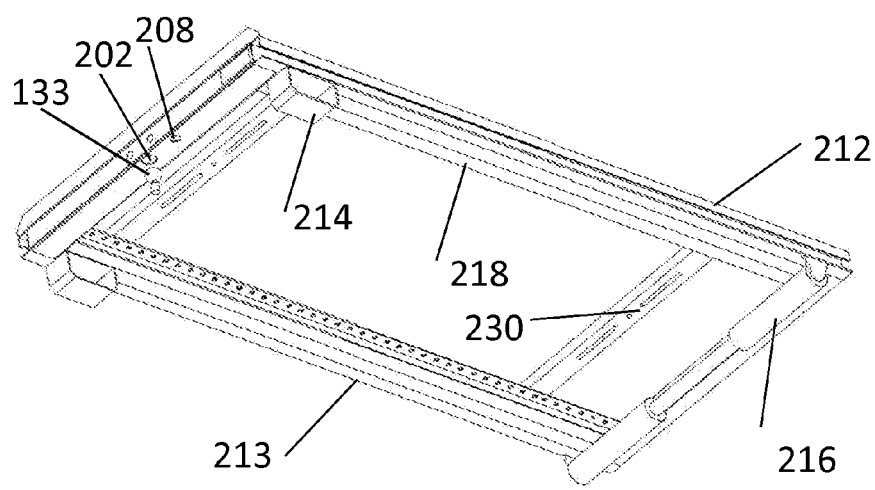
FIG. 11 represents one interchangeable platform 200 in perspective seen from side below.

The interchangeable platform is arranged to be pulled on to its transport device 500 supported by a roll 166. The interchangeable platform can include additionally at least one guide 218 (FIG. 11). The interchangeable platform may include two guides 218. Guides can be essentially parallel with the longitudinal direction of the interchangeable platform. Guides form an angle with the longitudinal direction of the interchangeable platform that is essentially less than 30 degrees. The guides 218 are arranged at the underside of the interchangeable platform 200 between the first and second side beams. Thus the interchangeable platform 200 can be moved to its transport device 500 or from its transport device 500 supported by guides 218. When pulling the interchangeable platform to its transport device guides 218 set on the back roll 166 of the transport device 500. Guides may additionally be positioned on the lower guide 172. The guide 218 may be also planar thus forming a level underside to the interchangeable platform. Also in this case the interchangeable platform 200 may be moved to its transport device 500 or from transport device 500 supported by the guide 218. A guide may comprise of for example a floor plate and support structures to support the floor plate. A guide may include additionally as an example surface plate, so that the guide forms a level base for the interchangeable platform. At least part of a guide 218 may lie between stands, like skids 214.

Alternatively the side beams 212 and 213 of the interchangeable platform 200 may be closed underneath, thus the interchangeable platform 200 can be moved to the transport device 500 or from the transport device 500 supported by the first or the second side beam 212, 213.

In addition to the guides 218 the side beams 212 and 213 may be closed underneath, thus the interchangeable platform 200 may be moved to its transport device 500 or from its transport device 500 supported by the first and second side beam 212, 213 or supported essentially by guides the 218 that are essentially parallel to the longitudinal direction or supported by mentioned first and second side beam 212, 213 and mentioned guides 218 that are essentially parallel to the longitudinal direction.

In the case the interchangeable platform includes guides 218 and skids 214, the distance between skids 214 is advantageously fitted so that mentioned third and fourth guide 218 stay between skids 214. In this case the interchangeable platform 200 may be moved to its transport device 500 or from its transport device 500 supported by guides 218 without that skids 214 hinder moving.

If the interchangeable platform includes side beams closed from beneath 212 and 213 and skids 214, particularly if the interchangeable platform does not include guides 218, the distance between skids 214 is arranged so that at least part of first and second side beams is between skids 214. In this case the interchangeable platform 200 may be moved to its transport device 500 or from its transport device 500 supported by the first and second side beams 212, 213 without that skids 214 hinder moving.

The wheel, roll or roller 216 diameter is advantageously at most 180 mm, preferably at most 150 mm and optimally at most 100 mm. Thus the interchangeable platform 200 has low height and takes little space when stacked. Low height is easier to load than a higher interchangeable platform. Especially a low interchangeable platform is easier to load than a transport device, with a high bed.

The wheel, roll or roller 216 is advantageously arranged to attach interchangeable platform 200 so that the wheel, roll or roller 216 is in lower position in its entity than the plane of the upside of the interchangeable platform.

Figure 12:
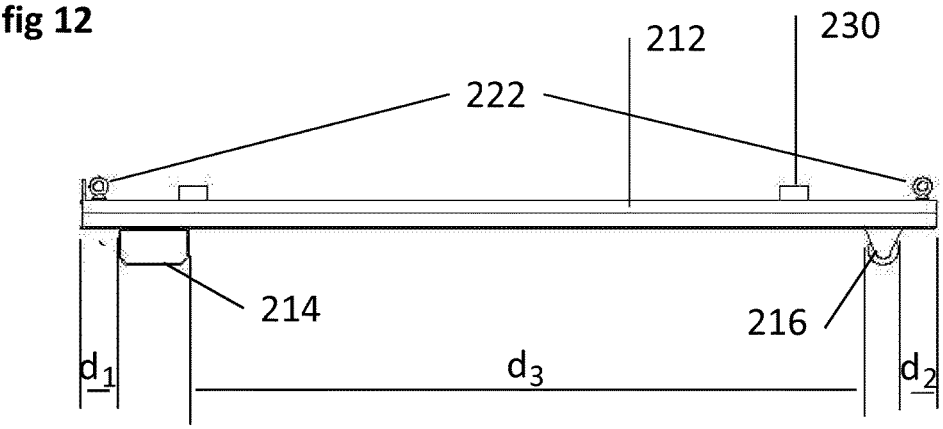
FIG. 12 represents interchangeable platform 200 In the FIG. 10 seen from side.
Figure 13:
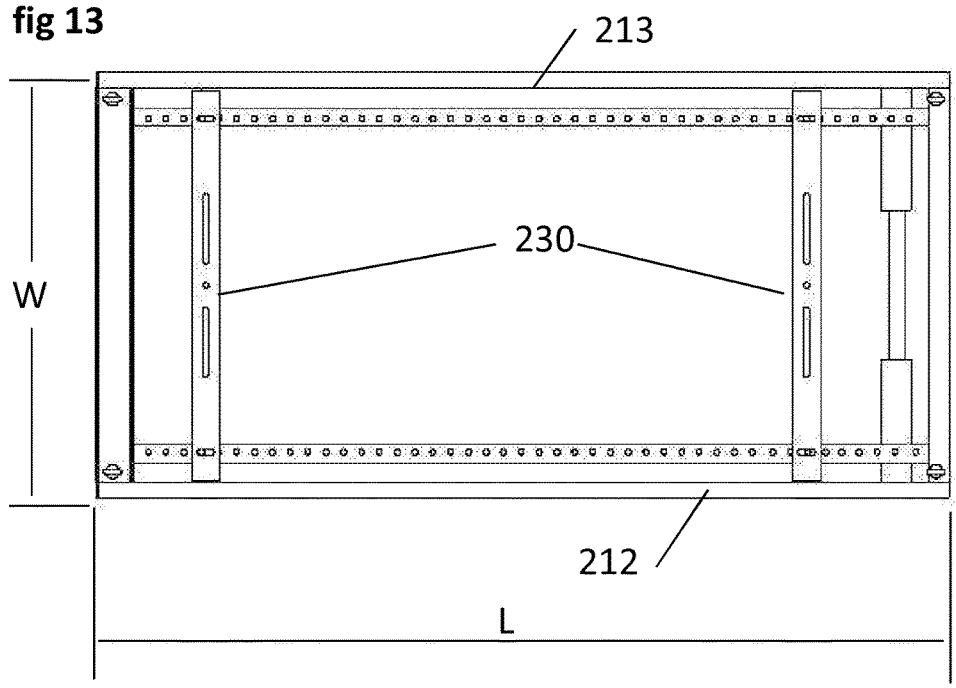
FIG. 13 represents interchangeable platform 200 In the FIG. 10 seen from above.

The upper part of the interchangeable platform refers to the upper part of the interchangeable platform when the load carrier is in use. The upper part may mean the upper part of the support structure 230 (FIG. 12). The support structure 230 may be arranged between side beams 212 and 213, in this case upper part may mean the upper part of side beams 212, 213. Support structure 230 may be arranged between guides 218, in which case upper part may mean the upper part of guides. As illustrated in the FIGS. 12 and 13, afore mentioned upper part defines the plane mentioned. When a wheel roll or roller 216 is in its entity lower than the mentioned plane, the interchangeable platform may be covered by a load carrier bottom part that goes over the wheel roll or roller 216. This bottom part may be built on afore mentioned plane; as an example on a support structure 230 (FIGS. 12 and 13). Load carrier bottom may be built also or alternatively on guides 218 or on side beams 212, 213.

In the FIG. 1 there is additionally a transport device 500 of an interchangeable platform. The transport device 500 is arranged to be movable in one first direction forward. The first direction in the FIG. 1 is parallel with the tow bar 190 and out of two possible directions more to the left. In addition the transport device 500 comprises of a chassis 510 and loading device 100 to pull the interchangeable platform 200 on to the transport device 500 at a second direction that forms a sharp angle with the first direction. Referring to the FIG. 1 mentioned second direction may be essentially the same as the first direction. Referring to the FIG. 2 mentioned the second direction may differ from the first direction. Additionally the transport device 500 is arranged to target a gravity support force to the interchangeable platform 200. Referring to FIGS. 1 and 2, the interchangeable platform 200 is supported as an example by the arm 110 and the roll 166.

In one form of the invention the transport device 500 comprises additionally an unloading device, that is arranged to cause the gravity supporting force and additionally target a force to the interchangeable platform 200, so that the direction of that force forms an angle with the first direction forming an obtuse angle or straight angle. An obtuse angle is known to be more than 90 degrees, but less than 180 degrees. In this case the transport device 500 is arranged to unload the interchangeable platform 200 backwards along the transport device with the aid of gravity and unloading device. The term "backwards" described this way covers also cases where the interchangeable platform is moved to a direction that is at an angle of more than 90 degrees with the transport device 500 "forward" direction. Additionally the interchangeable platform 200 may be unloaded from the transport device along the transport device, in other words, without the interchangeable platform is lifted from the transport device. In this case the interchangeable platform 200 may be unloaded from the transport device 500 using a smaller force than is necessary when lifting. Referring to FIGS. 1 and 2 the transport device 500 may be arranged to target a force to the interchangeable platform 200 so that the interchangeable platform is being pushed off the transport device along the arm supported by the roll 166.

The unloading device may be part of the loading device. An unloading device may be as an example a combined loading and unloading device 100 (FIG. 2). The loading and unloading device 100 includes among other things a loading cable 132, an unloading cable 137, a winch 120 to reel the cable and an arm 110 and a roll 166 to guide the cable. The loading and unloading device 100 may include additionally a carrier 150 to steer the interchangeable platform 200, to lock the interchangeable platform 200 on a position and to push the interchangeable platform 200 out of the roll 166. Other features of the loading and unloading device 100 are presented later.

In the FIG. 2 one phase of the loading or unloading of the interchangeable platform is presented. In this phase the arm 110 and essentially parallel interchangeable platform 200 together form an angle with horizontal line. In this case the transport device 500 targets an gravity supporting force to the interchangeable platform 200, so that the force has a backwards component, in that sense as "backwards" is defined before. Additionally the transport device 500 is arranged to unload the interchangeable platform 200 off the transport device backwards along the transport device by the unloading device.

This kind of transport device 500 that is arranged to unload the load, does not necessarily include the guides of the interchangeable platform 172, 173, 174. The transport device 500 that is arranged to unload the load, may are arranged to work with the interchangeable platform 200, so it may include the guide of the interchangeable platform. As an example the limiter 174 and/or lower guide 172. Advantageously the transport device 500 includes at least the limiter 174. When the side beam 212, 213 of the interchangeable platform is closed above, it may be possible that only the side guides, like the limiter 174, are needed to guide the interchangeable platform. In this case the closed upper part of side beam 212, 213 can lean to the side guide to support the interchangeable platform in vertical direction. The limiter 174 of the interchangeable platform supports the interchangeable platform in horizontal direction.

Additionally the side guide may support the interchangeable platform in horizontal direction. When the side beam 212, 213 is closed from under, the lower guides 172 may support the interchangeable platform 200 underneath at side bars 212, 213. The interchangeable platform 200 may include also separate guides 218, 219, thus lower guides 172 may support the interchangeable platform underneath by guides 218, 219. Lower guides in the FIG. 4 comprise wheel, roll or roller. The wheel of the lower guide 172 has a horizontal axle, when the transport device 500 is on horizontal platform. This kind of direction of the lower guide 172 targets the support from the lower guide 172 to interchangeable platform 200 effectively upwards. The limiter 174 of the interchangeable platform and/or side guide 173 supports the interchangeable platform horizontally, in other words: because of the fact that the roll 166 width is fitted to the distance between the skids 214, or the distance between the skids is fitted to the width of the roll 166. Thus, to enable the roll 166 to pass between skids, the interchangeable platform should advantageously be guided horizontally.

The transport device 500 in the FIGS. 1-6 comprises one common loading and unloading device 100. In this case the count of the summed loading and unloading device is one. One common loading and unloading device may be more economical to invest in, compared to separate loading and unloading devices. One common loading and unloading device 100 is arranged to pull the interchangeable platform 200 on to the transport device 500 and unload the interchangeable platform from the transport device 500.

The longitudinal direction of the transport device 500 in the FIGS. 1-3 is in the direction of previously mentioned first direction, so the longitudinal direction targets "forwards". The transport device 500 includes the arm 110, that directs or may be directed into such direction, that it belongs to a plane encompassing the longitudinal direction of the transport device and is vertical. In the FIGS. 1-4 the arm 110 directs into such orientation. In the FIG. 2 the transport device 500 encompasses a cross joint 180. The cross joint is presented in more detail in the FIGS. 7 and 8. The cross joint includes a tilt hinge 181 (FIG. 7), by the help of which the arm 110 is connected to the chassis 510 (like the arm 180) enabling turning, so that the first end of the arm is arranged to be movable in vertical direction when the transport device is on horizontal platform. As an example in the FIGS. 1-4 that end of the arm 110 with the loading reel 130 is arranged moveable in such a way. The length of the tow bar 190 may be, as an example 2 m-5 m, advantageously about 3 m. The tow bar 190 includes apparatus, in its first head, for attaching transport device 500 to the towing vehicle. The transport device 500 may alternatively be a part of the vehicle.

Figure 25A:
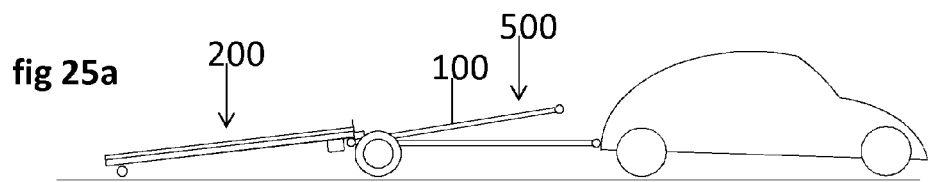
FIGS. 25a-25e represent some arrangements for using the invention with different types of vehicles or with devices used together with transport vehicles.
Figure 25B:
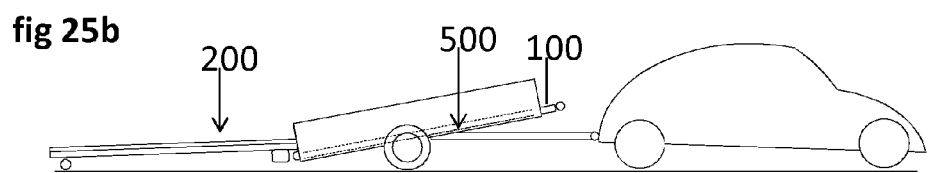
Figure 25C:
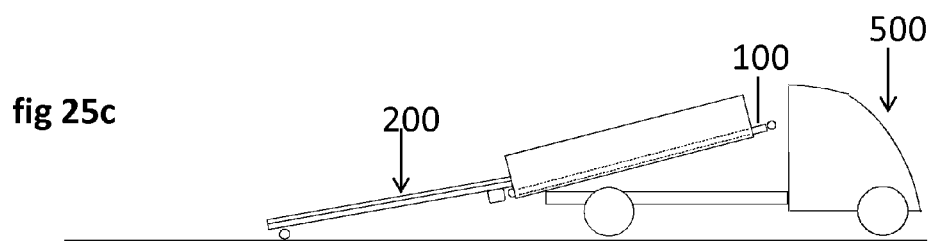
Figure 25D:
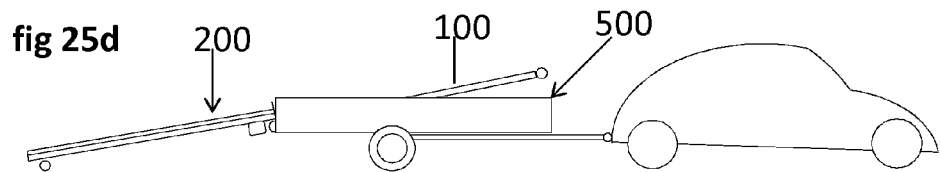
Figure 25E:
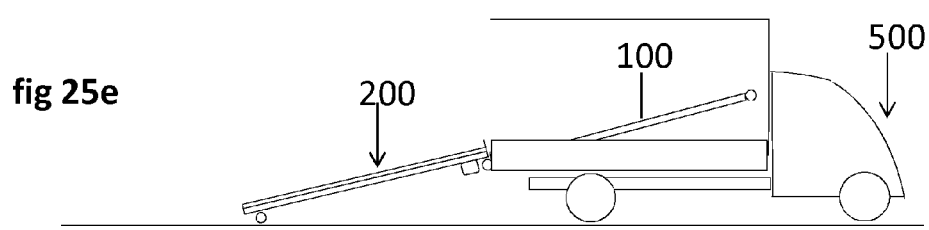

It is possible, that the transport device 500 comprises a load carrier with tilt, and the arm 110 is attached on the load platform of the vehicle (see FIGS. 25b and 25c). It is also possible that the vehicle comprises a load platform, without a tilt (see FIGS. 25D and 25e). Even in this case the transport device 500 may include a tilt hinge, making it possible to attach the arm 110 to the chassis 510 of the vehicle and can be pivoted in a way as described earlier. Depending on arrangement the tilt hinge may be arranged to facilitate turning of the arm and the load carrier (FIGS. 25B and 25c), on which the arm 110 is attached or only the arm 110 that is attached to a fixed load carrier platform (FIGS. 25d and 25e).

The transport device 500 includes additionally apparatus to attach the interchangeable platform 200 to the transport device. In the FIG. 4 one example of these apparatus is presented. In the FIG. 4 there is a ball 133 that is attached to the loading cable 132. The ball 133 may be attached to the interchangeable platform 200. The ball is a common apparatus, attaching trailers. Thus the interchangeable platform 200 that is attachable to the ball 133 is attachable also to another transport device equipped with the ball. The diameter of the ball is advantageously 50 mm. The transport device may encompass also or as an alternative other type of fastening apparatus.

The transport device 500 includes at least one winch 120 to move the interchangeable platform 200 in the direction of the arm 110 forward and backward. The transport device 500 includes additionally at least one cable 132, 137 to transfer the force from the winch 120 to the fastening apparatus 133 of the interchangeable platform 200. The transport device 500 includes additionally at least one roll 166 to guide the interchangeable platform 200 and/or a cable 132, 137. Thus the transport device 500 is arranged to pull the interchangeable platform 200 onto the transport device 500 and unload the interchangeable platform 200 from the transport device 500 backwards by an arm 110 that can be pivoted, with the aid of the winch 120.

In the FIGS. 1-4 the transport device includes additionally a carrier 150 that is attached to the arm 110, in such way it can move. The operation of the carrier 150 is illustrated later in detail. The carrier 150 is arranged, in other words: to guide the cables 132, 137. Additionally the carrier 150 is arranged so, in a way described later, that it moves when the load is loaded or unloaded.

Referencing to FIGS. 5-8, the transport device 500 may include a cross joint. The cross joint may additionally include a vertical hinge 182. By the vertical hinge 182 the arm 110 is arranged to be able to pivot with reference to the chassis 510 so that the first end of the arm 110 is arranged to be movable with reference to the chassis 510 in horizontal direction when the transport device 500 is on horizontal support. The mentioned first end includes a winch 120 and/or a loading reel 130 (see FIGS. 1-6). The cross joint 180 may situate in front of the wheel axle arrangement 101 (FIGS. 3 and 7), as an example just right in front of the wheel axle arrangement 101.

Figure 5:
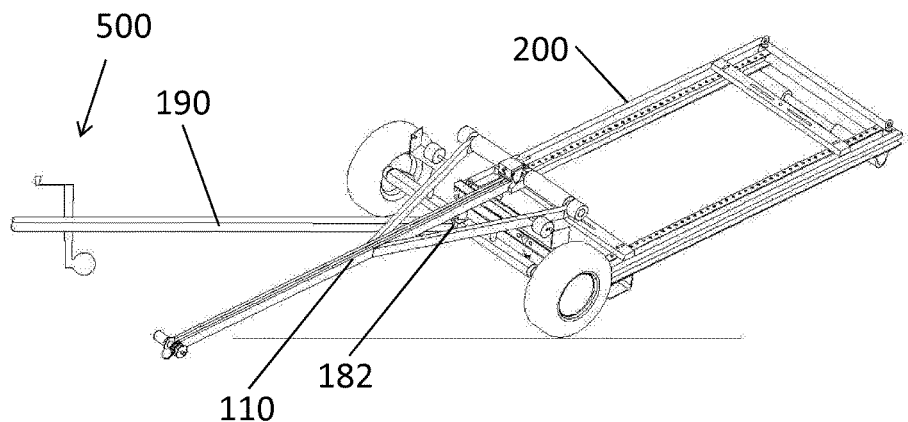
FIG. 5 represents one interchangeable platform 200 and its transport device 500, when the interchangeable platform 200 is not on the transport device 500, and when the loading or unloading is or is being done along a line which is off the vehicle direction.
Figure 6:
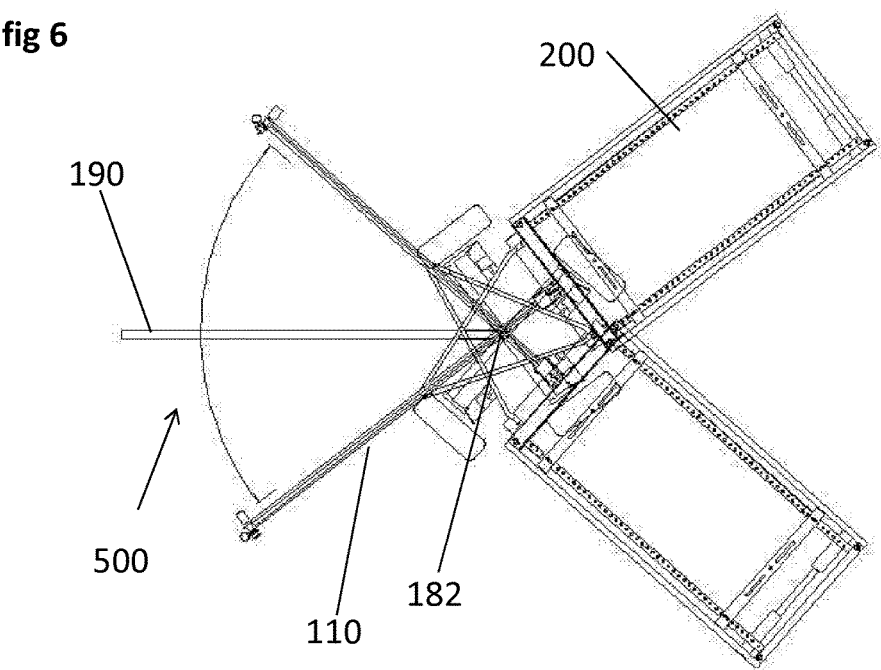
FIG. 6 represents one interchangeable platform 200 and its transport device 500, in two different extreme positions, where the transport device arm 110 is arranged at an angle to the tow bar 190 of the transport device by a vertical hinge.

As it is presented In the FIGS. 5 and 6, because of the vertical hinge 182 (as an example cross joint 182 vertical hinge) the arm may turn in horizontal direction in relation to the tow bar 190 (or chassis 510). The tow bar 190 is arranged to be fixed on to the towing vehicle. With this arrangement several advantages are achieved. Firstly the interchangeable platform 200 can be pulled on to the transport device 500, although longitudinal directions of the interchangeable platform 200 and the transport device 500 would not be the same. As an example the longitudinal direction of the interchangeable platform may be at most about 45 degrees in relation to the transport device 500 longitudinal direction clockwise or counter clockwise while loading the interchangeable platform. Thus the difference of extreme positions of longitudinal directions of the interchangeable platform may be at most about 90 degrees. The interchangeable platform may also twist while loading. The FIG. 6 shows situations where the angle is about 45 degrees clockwise or counter clockwise while loading the interchangeable platform. Then it is not so exact how and in what orientation the transport device 500 is let to approach the interchangeable platform 200 before the interchangeable platform is pulled to the transport device. Additionally the interchangeable platform may pivot while loaded. As an example by tightening the loading cable 132, the interchangeable platform 200 may turn so that the front side targets towards the roll 166.

Secondly the interchangeable platform 200 may be unloaded in to such a place, that would not be necessarily possible otherwise, as an example round the corner. The transport device 500 may be backed so that the wheels 103 (FIG. 3) are steered beyond a corner, like a building corner. After this the interchangeable platform 200 and the arm 110 may be turned in relation to the tow bar 190. If the transport device has an unloading device, the interchangeable platform 200 may be pulled from the transport device in a direction that is opposite to the direction of the arm 110. In this case the load is unloaded at an angle in relation to the direction of the tow bar 190, as an example round the corner. Additionally, because of the unloading device, the transport device 500 has not to be moved during unloading, instead the interchangeable platform may be dragged and/or pulled from the transport device 500. If the arm 110 direction is at most at an angel of 45 degrees in reference to the first direction of the transport device 500, like in to the direction "forward" defined by the tow bar 190, the interchangeable platform 200 may be moved in a direction of the arm while unloading. That direction forms an angle of at least 135 degrees with the first direction of the transport device 500.

Figure 4:
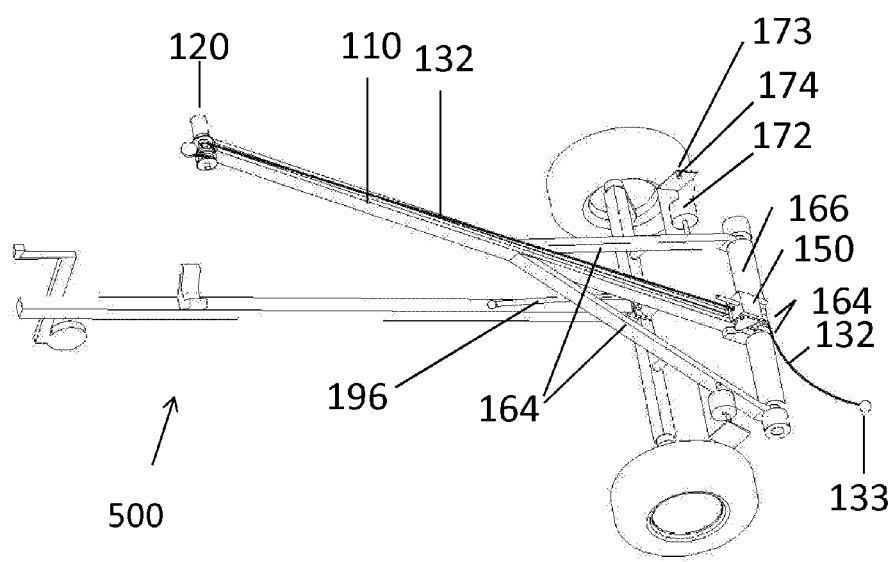
FIG. 4 represents one transport device 500.

In reference to the FIG. 4, in one arrangement the transport device 500 has a balance spring 169, like a gas spring. With the aid of the balance spring the first angle of the arm in relation to the chassis 510 may be affected. By the first angle it is meant an angle between a plane defined by the arm 110 and axle arrangement 101 and a plane defined by tow bar 190 and axle arrangement. With the aid of the balance spring the arm 110 is arranged at a first angle in reference to chassis 510, when the arm 110 is affected by vertical force that is less than the force by balance spring 196. As an example in the FIG. 2, when the interchangeable platform 200 rear part presses the arm up, the arm is up, that is, at an first angle in reference to the chassis 510. The balance spring may be dimensioned so that the arm 110 tilts from the transportation position, that is, horizontal position, to about 30 degrees angle in reference to the transportation position, when the weight of the front side of the interchangeable platform presses the roll 166 down by the loading cable 162. This kind of situation exists as an example in the beginning of loading phase, when the interchangeable platform 200 front side is lifted with the loading cable 132, that is supported by the roll 166. Advantageously without the interchangeable platform 200 the loading/unloading device 100 is a bit front heavy, so that without a load the arm 110 settles horizontally, thus making the first angle go to zero.

Correspondingly in the FIG. 3, when a interchangeable platform 200 is on the arm there is a force by the interchangeable platform to the arm 110, especially the momentum of this force in relation to the arm 110 horizontal hinge (tilt hinge 181), targets a force to the balance spring 196 so that the balance spring is essentially compressed. Thus the arm 110 is essentially parallel with the chassis 510. Also when loaded the arm 110 may have a value in the first angle direction with reference to the chassis 510. As described earlier, the arm 110 may be at another angle with reference to tow bar 190 because of the vertical hinge 182.

The balance spring may be arranged into the loading and unloading device 100. As an example in the FIGS. 25a, 25d, and 25e the balance spring may be arranged to be compressible. Alternatively, as an example in the case In the FIGS. 25B and 25c, the balance spring 196 may be arranged into a transport device that has a load carrying section that can be tilted. In this case the balance spring 196 may be arranged to be compressed when the load carrying section of the transport device 500 directs a force, the moment of which in reference to the tilt hinge exceeds the limit defined be the balance spring 196.

Referencing to FIG. 3, in one form the transport device 500 includes a wheel 103 that is arranged to support the transport device 500 to the ground. The transport device 500 may encompass multiple wheels like boggie wheels that encompass the mentioned wheel 103. The wheel 103 is attached to the transport device 500 and is arranged to revolve around its rotating axle. The rotating axle is level when the transport device is at level base. The rotating axle is perpendicular to the first direction when the transport device 500 goes forward. The rotating axle may be arranged by as an example an axle arrangement 101. By the axle arrangement 101 it is meant a device, to which the wheels 103 may be attached to make up a rotating axle, so that they may revolve. The roll 166 (FIGS. 1 and 4) of the transport device is arranged to be back of the mentioned wheel 103 axle arrangement 101, back in relation to the first direction.

Thus the interchangeable platform 200 may be steered to the arm 110 over the roll 166 so that the axle arrangement 101 stays under the interchangeable platform 200. Preferably the roll 166 of the transport device is arranged to be back of the wheel 103. More preferably the roll 166 is arranged back from the fender of the mentioned wheel. In this case also such a interchangeable platform 200 that encompasses wide equipment, like flatbed on the side beams 212, 213 or guides 218 and the width of which is greater that the width of an interchangeable platform 200, can be freely pulled to the transport device 500 over the roll 166.

In the FIGS. 7 and 8 the cross joint 180 is described more closely. In the FIG. 7 the cross joint 180 is presented from the side. The cross joint 180 is attached to the tow bar 190, like to the chassis of the transport device 510. The cross joint 180 encompasses a tilt hinge 181. When the transport device 500 is on level base, the pivoting axle of the tilt hinge is essentially level. The tilt hinge 181 makes it possible the vertical turning of the tow bar 190 presented In the FIGS. 1 and 2.

In the FIG. 8 the cross joint 180 is presented as seen from up. The cross joint 180 is attached to the tow bar 190, likewise to the chassis 510. The cross joint encompasses a vertical hinge 182. When the transport device 500 is at level support the rotating axle defined by the turning hinge is essentially vertical. Depending of the order of the tilt hinge 181 and the vertical hinge 182 and the position of the arm 110, the mentioned turning axle may take also other positions than vertical. As an example in the FIG. 8, the turning axle defined by vertical hinge turns when the arm 110 is lifted. The tilt hinge 181 makes it possible to tilt the arm 110, thus changing the direction of the vertical hinge 182. The vertical hinge makes it possible the horizontal turning of the arm 110 presented In the FIGS. 5 and 6.

In the FIGS. 18 and 19 is illustrated part of the loading and unloading device 100. In the FIG. 18 there is a winch 120 seen from side. The winch 120 is arranged to the end of the arm 110. The winch 120 is arranged to reel the loading cable 132 to the loading reel 130 (FIG. 19) or unwind the loading cable 132 from the loading reel. Correspondingly the winch 120 is arranged to unwind the unloading cable 137 from the unloading reel 136 or to reel the unloading cable 137 to the unloading reel 136 (FIG. 19). By reeling the loading cable 132 to the loading reel 130 the interchangeable platform 200 may be pulled on to the transport device 500. Correspondingly by reeling the unloading cable 137 to the unloading reel 136 the interchangeable platform may be pulled from the transport device 500. Like it is illustrated, the other of the reels 130, 136 is attached solidly to the winch. In other words when the axle of the winch revolves at least one of the reels 130, 136 revolves. In the arrangements In the figures the loading reel 130 is attached to the winch 120 in this way.

According to FIGS. 18 and 19 the transport device 500 may encompass equipment (122, 126, 128) to control the winch 120. The equipment may encompass an electrical motor 122, a power switch 126 and a limit switch 128. According to the FIG. 19 the power switch may consist of several buttons, by which the winch, especially the electrical motor may be operated. With the aid of the limit switch 128 it is possible to automatically control the winch. As an example the arm load of the transport device 500 may be specified. With arm load it is meant the weight that the tow bar 190 causes to the vehicle pulling the transport device.

The winch 120 may be arranged to be controlled using information from at least one of the following
the angle between the arm 110 and the chassis 510,
the mass of the load and
the momentum caused by the load, the interchangeable platform 200 and the arm 110.

As an example the balance spring 196 may be arranged to be compressed when the arm load is proper. The limit switch 128 may as an example stop pulling of the interchangeable platform when the angle between the arm and the chassis becomes smaller that certain limit. Off the balance spring the limit switch 128 may as an example stop pulling of the interchangeable platform when the load is too big. This way it is possible to prevent loading of the transport device 500 when the load is too big. Alternatively or in addition the limit switch 128 may as an example stop pulling of the interchangeable platform when the momentum to the arm 110 caused by the load and/or the interchangeable platform and/or the arm 110 exceeds a certain limit. The afore mentioned momentum is in relation to the arm load. Thus the arm load may be automatically weighted to be suitable. The automatic weighting may be accomplished by the mentioned momentum or by mentioned angle. In the FIG. 19 the limit switch 128 is placed at the tow bar 190 specifically into the lower part of the cushion 199 (FIG. 2). Thus the afore mentioned angle or momentum may be used easily to control the motor 122 of the winch. A warning light 129 or other equipment may be arranged in to connection of the winch 120, to transmit information. As an example the warning light 129 may be arranged to emit light when there is a voltage between electrical contacts of the motor 122 of the winch.

Advantageously both the unloading cable 137 and the loading cable 132 are arranged on the longitudinal direction of the arm and into a vertical plane that includes the longitudinal direction of the arm 110. In the FIG. 19 the loading reel 130 is arranged in such a way that the mentioned plane crosses the loading reel. In this case the loading cable 132 naturally unwinds from the loading reel 130 suitably in reference to arm 110. In the FIG. 19 there is presented additionally a pulley 139 by which the unloading cable 137 goes from the unloading reel 135 to the arm 110 to a suitable position. Cables go along the arm 110 to the roll 166. As a loading and unloading cable a single cable may be used that goes round the roll 166. By reeling the cable to the loading or unloading reel it is possible to move the attachment device like the ball 133 and an interchangeable platform possibly attached to it along the arm 110 towards or from the winch 120. Advantageously the transport device includes a separate loading cable 132 and an unloading cable 137. Advantageously the loading cable is long, as the loading cable is possible to attach to an interchangeable platform 200 that is a good way off from the transport device 500. The length of the loading cable may be at least 5 m, preferably at least 10 m, and optimally at least 15 m.

The tow bar 190 may include an arm lock (not presented) to lock the arm 110 to the tow bar 190 during transport. The power feed to the winch 120 may be arranged so that while the arm lock is locked, the system is without power.

Referring to FIGS. 18 and 19, the transport device includes a loading reel 130 for the loading cable 132 and an unloading reel for the unloading cable 137. The loading reel 130 and the unloading reel 136 are arranged to revolve mutually in the same direction round the revolving axle. Like it is presented in the FIG. 18, the loading cable reeling out point from the loading reel 130 is arranged into the first side of the revolving axle, in the FIG. 18 on the upside of the revolving axle. The revolving axle in the FIG. 18 is about at the height of the arm midpoint. Additionally the out reeling point of the unloading cable 137 of the unloading reel 136 is arranged to the another side, opposite, in reference to the revolving axle. In the FIG. 18 at the underside. Thus cables are wound on the reels into opposite directions. Thus when the loading reel 130 and unloading reel 136 are revolving, the first reel (130, 136) winds the cable (132,137) to the first reel (130, 136) and the second reel (136, 130) and the second reel (136, 130) unwinds the cable (137, 132) from the second reel (136, 130).

In the FIGS. 18 and 19 additionally a brake 138 is presented, with a help of which the revolving on unloading reel 136 may be stopped or slowed. The revolving of the unloading reel 136 may be slowed as an example during loading. If the loading and unloading device includes a ratchet clutch 135 (FIG. 19), that is arranged to transmit power from the loading reel 130 to the unloading reel 136 only during unloading, then during loading the loading reel 136 would be able to revolve freely, then by a brake 138 it is possible to limit excessive revolving of the loading reel 136 and slacking of the loading cable 137. Excessive slacking is, among other things, a security risk.

Referring to the FIG. 19, the loading device 100 includes a friction clutch 134. The friction clutch 134 makes it possible, that the unloading reel 136 and the loading reel 130 revolve at somewhat different speed (revolving speed unit is rad/s). Different revolving speed is advantageous, because the diameters of the reels are different, but the reeling speed (reeling speed unit is m/s) the same, but in opposite direction. Additionally the tension of cables 137, 132 should be suitable. With the aid of friction clutch 134 it is possible to affect on the tension of the cables. If the friction clutch slides easily, the cables remain loose. The friction clutch 134 defines additionally the maximum force that may be applied to the interchangeable platform during unloading. Thus the friction clutch should stay so tight, that the mentioned force is enough to push the interchangeable platform 200 out off the transport device 500 to as an example lose ground and/or uphill. Additionally by the friction clutch it is possible to unload the loading cable 132 to the interchangeable platform 200 that is further away. When unloading the loading cable 132 this way from the loading reel 130 the unloading reel 136 does not revolve.

Like it is presented in the FIGS. 18 and 19, advantageously the diameter of the loading reel 130 is smaller than the diameter of the unloading reel. Thus the loading reel 137 does not get slack during unloading. While unloading the motor 122 force transfers to the loading reel 130. Further the motor 122 force is transferred to the unloading reel 136 via the friction clutch 135. When the diameter of the loading reel 130 is smaller than the diameter of the unloading reel 136, the unloading reel 136 revolves with smaller revolving speed (rad/s) than the loading reel 136. The friction clutch 134 makes the revolving speed difference of reels 130, 136 possible and transmits the motor 122 momentum to the unloading reel 136 when the loading cable 132 allows that. If the friction clutch 134 slides easily, cables remain slack. In this case additionally the winch gives a secure speed to the carrier 150 and to the interchangeable platform 200. Then the speed of the interchangeable platform does not get too high. If the speed of the interchangeable platform would get too high, the interchangeable platform could fall uncontrollably off the roll 166, what could cause load damage. Additionally because of the difference in reel 130, 136 diameters, it is possible to apply a bigger force to the interchangeable platform while loading than while unloading.

Alternatively or additionally the loading and unloading device 100 may include a one way clutch 135 that allows free rotation of the loading reel 130 in relation to the unloading reel 136 only in one particular direction, the first direction. When revolving to the other, opposite, direction the one way clutch transfers the momentum from the loading reel 130 to the unloading reel. As an example of this kind of one way clutch a ratchet clutch or a one way bearing may be used. As an example the ratchet clutch 135 may be fitted in such a way that while loading and the loading reel 130 revolving, the loading reel momentum is not transferred to the unloading reel 136. Thus the unloading cable 137 is unwound from the unloading reel 136, because of the fact, that the movement of the loading cable 132 tightens the unloading cable 137, by as an example the carrier 150. The brake 138 may be additionally used to prohibit excessive revolving of the unloading reel 136 and the unloading cable 137 becoming slack in a loading situation.

Referencing to the FIG. 4, the roller 166 of the transport device 500 is arranged to the end on the arm 110. Then it could be possible, that by the carrier 150 the interchangeable platform 200 could be moved off the transport device 500 only to the point of roll 166. Pushing the interchangeable platform 200 out off the roll 166, can be achieved by arranging specific equipment to the carrier 150 to push the interchangeable platform off the roll 166.

In the FIG. 9 is presented one arrangement of the carrier 150 in more detail. It is obvious, that the transport device 500 includes the mentioned carrier 150. The carrier 150 in attached to the arm 110 so it can move. The movability of the carrier 150 in relation to the arm 110 may be achieved by rollers and slide surfaces. One of the functions of the carrier is, for example, to function as a transportation vehicle for the front side of the interchangeable platform during loading and unloading. One task of the carrier is to connect the front side of the interchangeable platform to the arm during transport. The carrier includes a stopper 156 in the direction of the front side of the interchangeable platform. During loading the interchangeable platform 200 is pulled against the stopper 156 by the loading cable 132. Advantageously the arm 110 includes a slot 115 that opens upwards. The carrier 150 is arranged partly to the slot in the arm 110. The cross section form of the arm may be upwards open square. Side length of the square form may be as an example 40 mm-120 mm; advantageously about 60 mm. The carrier 150 may be moved with the aid of the loading cable 132 and unloading cable 137. On the other hand, while loading the interchangeable platform is pulled towards the first end of the arm (winch) by the loading cable 132, the interchangeable platform pushes the carrier 150 ahead towards the first head of the arm. On the other hand when unloading, when the carrier 150 is being pulled towards the opposite, second head, of the arm by the unloading cable 137, the carrier 150 pushes the interchangeable platform 200 ahead towards the other end of the arm.

The carrier 150 in the FIG. 9 encompasses a pusher 158 that is arranged to push the interchangeable platform 200 off the reel 166. The carrier 150 encompass additionally a spring 159, that is arranged to pull the pusher 158 parallel with the arm 110 forward, thus in the first direction of the mentioned transport device, when the arm 110 and the chassis 510 are parallel. Loading and unloading cables go through the cable hole 157.

The stopper 156 of the carrier 150 in the FIG. 9 encompasses a vertical and horizontal component. The horizontal stopper is arranged partly under the interchangeable platform 200, when the interchangeable platform is on the transport device. The vertical component of the stopper 156 is arranged to be against the front side of the interchangeable platform 200, when the interchangeable platform is on the transport device. The upper part of the horizontal component of the stopper 157 is at the level of the back roll or a bit lower. The mentioned cable hole 157 is on the vertical component of the stopper 156. The unloading cable 137 is arranged to go from the unloading reel 136 (FIG. 9) inside the arm 110 profile to the back roll 166. Further the unloading cable 137 is arranged to go under the back roll, round the roll and continuing to the carrier 150. Further the unloading cable 137 is arranged to go through the cable hole 157 and to attach the pusher 158, to the first end of the pusher. The loading cable 132 coming from the loading reel 130 is arranged to go to the carrier 150 on the arm 110 and through the cable hole 157. At the end of the loading cable 132 it is arranged a fastening apparatus, like a ball 133, for the interchangeable platform 200 and the loading cable may go to the interchangeable platform 200.

When the interchangeable platform 200 is unloaded form the transport device 500, the unloading cable 137 is tightened by the winch 120 as described earlier. As the carrier 150 is free to move along the arm, the carrier 150 pushes the interchangeable platform 200 off the transport device 500. In the end of the unloading the carrier 150 reaches the roll 166 end of the arm 110 and cannot move along the arm 110. Then, when the unloading cable 137 is further tensioned, the unloading cable pulls the pusher 158 in the direction of the arm 110 essentially opposite direction in relation to the first direction, in other words backwards. The spring 159 gives up, so the pusher 158 is able to protrude backwards. If the interchangeable platform 200 is partially on the roll 166, the end of the pusher 158 directs/applies a force to the interchangeable platform 200 that pushes the interchangeable platform 200 off the roll 166. In this situation the spring 158 of the pusher cocks further compared to the situation before pushing the interchangeable platform off.

At loading when the interchangeable platform 200 comes over the roll 166 the front head of the interchangeable platform presses the pusher 158 forward. In this phase the spring loses its tension a bit. The spring 159 remains in tension also in this situation. Thus the spring 159 further pulls the carrier 150 backwards making it sure that the interchangeable platform 200 reaches the carrier stopper 156 and the latch 152 locks the interchangeable platform 200 on the carrier 150. Further tensioning the loading cable 132 the interchangeable platform 200 reaches the stopper 156, then the unloading cable 137 gives in by the ratchet clutch 135 and friction clutch 134 (FIG. 19) and the combination of the interchangeable platform 200 and the carrier 150 start to move along the arm 110. A ratchet clutch is advantageous as all of the momentum of the winch 120 motor 122 may be used to pull the interchangeable platform during loading.

A carrier 150 may encompass additionally an arm latch (not presented in the figures) to lock the carrier 10 to the arm 110 during transport.

Figure 10:
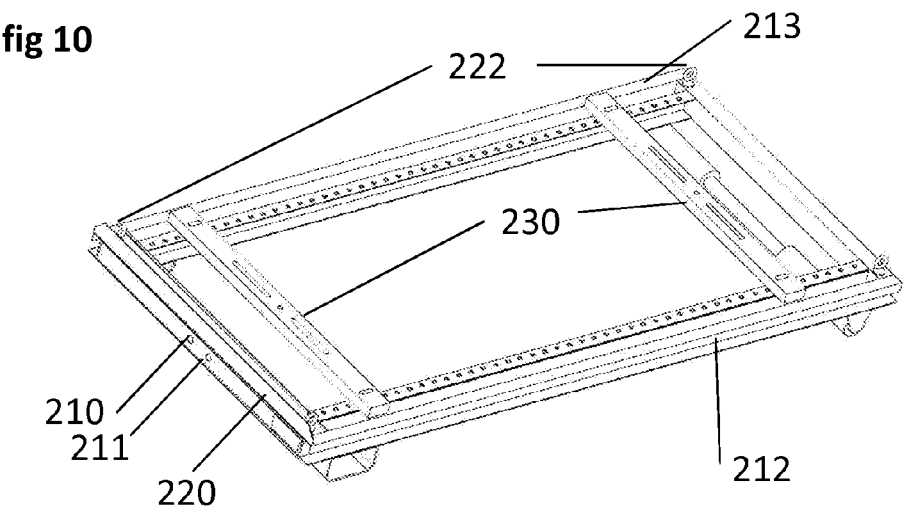
FIG. 10 represents one interchangeable platform 200 in perspective seen from side above.

The carrier 150 in the FIG. 9 encompasses additionally a limiter 154. The function of the limiter is to prevent transverse movement of the interchangeable platform 200. Referencing to FIG. 10, the interchangeable platform 200 may include a cotter hole 210 to which the limiter 154 is fitted. The carrier 150 in the FIG. 9 encompasses additionally a latch 152. Task of the latch is to prevent longitudinal movement on the interchangeable platform 200. Referring to the FIG. 10, the interchangeable platform 200 may encompass a latch hole 211, to which the latch 152 is fitted. The latch is formed in such a way that it may be form fitted longitudinally to the latch hole 211. As an example the latch 152 in the FIG. 9 has a form, to which the corresponding latch hole 211 upside edge may be fitted. The transport device 500 may encompass equipment to lock the arm 110 to the chassis 510 This kind on equipment may are arranged to function together with the latch 152 so that the latch 152 may not be opened when the arm is locked to the chassis 510. The latch 152 is arranged to open automatically by the release 169 (FIG. 9) when the carrier is at or near the limit at the back end of the arm. The inclined front side of the release 169 is arranged to lift the latch 152 when the carrier 150 approaches the release 169, thus making the latch to open automatically.

Referencing to the FIG. 4, to the end of the unloading cable 132 is attached a coupler device 133 to attach the interchangeable platform 200 to the transport device 500. When the interchangeable platform 200 is pulled to the transport device 500, the loading cable 132 pulls the interchangeable platform towards the arm 110 first end by the ball 133. At some stage the front side of the interchangeable platform 200 comes near the carrier 150. Especially at some stage the front part of the interchangeable platform 200 touches some part of the carrier, as an example at least one of the following: stopper 156, latch 152, limiter 154 and pusher 158. Tightening the loading cable 132 further, the interchangeable platform 200 pushes the carrier 150 in front towards the first end of the arm.

In the FIG. 9 it is presented apparatus, like a latch 152 and a limiter 154, with which the interchangeable platform 200 can be coupled to the carrier 150. Furthermore the transport device 500 may encompass an arm latch, with which the carrier 150 can be locked to the arm 110. The carrier 150 may be locked for transport, as an example. When the movement decelerates greatly as an example during braking or at an accident the interchangeable platform 200 may direct great forces to the carrier 150. Locking of the carrier 150 is one of the safety features. In addition to arm latch also cables 132, 137 keep the carrier 150 steady in relation to the arm 110. Alternatively or in addition the transport device may encompass means to attach the interchangeable platform 200 to the transport device chassis 510, arm 110 or to the guides of the interchangeable platform 173, 174.

The transport device 500 may encompass additionally an arm latch to lock the arm 110 to the chassis 510. Then the arm 110 can be locked to its position for transport. The arm latch can be arranged to the connection of the cushion 199 (FIG. 2).

In the FIGS. 1-4 it is illustrated transport devices 500 of an interchangeable platform that is arranged to be towable by a vehicle, like a car or van. Also In the FIG. 25a this form of arrangement is illustrated. Other arrangements are illustrated in the FIGS. 25a-25e. In the FIGS. 1-4 the transport device 500 does not encompass a separate load bed, but a separate interchangeable platform 200 forms the bed when necessary. Thus the transport device 500 is the trailer of the vehicle. The transport device 500 may mean also an ordinary utility trailer. The mentioned bed may have a tilt. Also as an example a platform truck or truck may be a transport device. In one arrangement a loading and unloading device 100 is arranged to the transport device. In one arrangement at least one interchangeable platform guide 172, 173,174 is arranged to the transport device.

Figure 15:
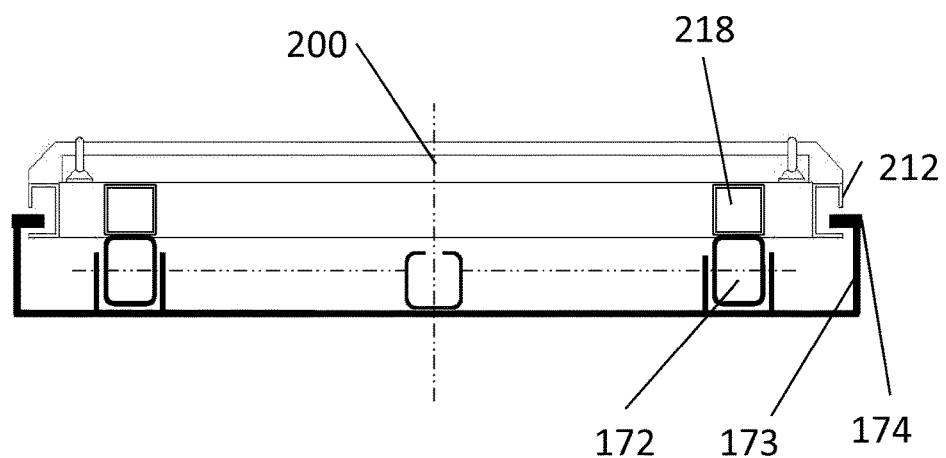
FIG. 15 represents a cross section diagram of a transport device at the load carrier guides 172, 173, 174 and the interchangeable platform 200 In the FIG. 10 as a cross section diagram, correspondingly, when the interchangeable platform is on its transport device, where positions of load carrier guides 172,173,174 are represented In the FIG. 1.
Figure 23:
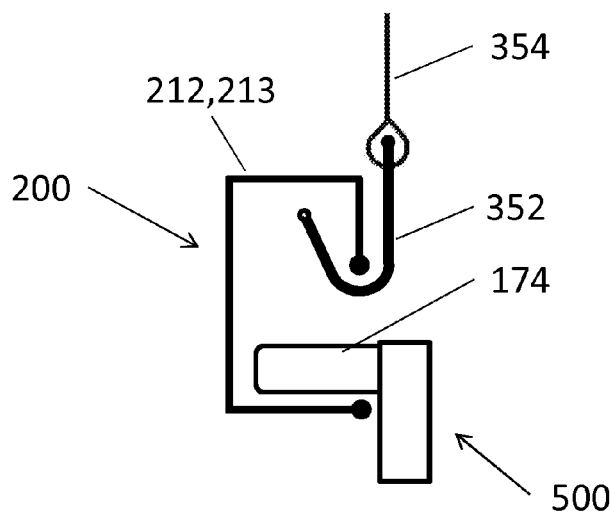
FIG. 23 represents load fastening to the interchangeable platform 200.

In the FIGS. 15 and 23 is presented a back cross section diagram of a part of the interchangeable platform 200 and part of the transport device 500. In the FIG. 15 it is presented a guide 218 of the interchangeable platform 200 that is supported by a lower guide 172. Additionally there is a side beam 212 of the interchangeable platform. A limiter 174 is arranged into the partially open profile of that side beam. In the FIG. 23 it is illustrated load fastening into this kind of an interchangeable platform 200. In the FIG. 23 it is presented another side beam 212 or 213 of the interchangeable platform 200. The side beam is at least partially open to the side, and into this open space an interchangeable platform 200 limiter 174 is arranged. In the manner described before the limiter is arranged when the interchangeable platform 200 is on one arrangement of a transport device 500. In the FIG. 23 it is additionally illustrated load fastening equipment, like fastening line 354 and fastening hook 352. The load fastening hook 352 may be as an example Y-hook. In the FIGS. 15 and 23 the side beam profile shape is upside down G-profile as a cross section. By an upside down G-profile it is meant a profile that has at least partial opening to the side direction perpendicular to the longitudinal direction. The upside down G-profile is additionally closed from up and down. Additionally the partially open side of the G-profile is partially closed in the top, like illustrated in the FIGS. 15 and 23. The height of the partially closed part of the partially open side of the upside down G-profile is as an example ¼, ⅓ or half of the height of the side beam 212, 213. The height of the partially open part of the partially open side of the upside down G-profile is as an example half, ⅔ or ¾ of the height of the side beam 212, 213. Because of partially closed form the load fastening equipment can be locked on to the side beam 212, 213. The load attachment hook 352 placement may be altered along the length of the side beam 212, 213 when the load fastening line 354 has not been tightened. The place may be altered by moving the load attachment hook 352 in the groove of the side beam 212, 213. The lower edge of the closed part of the partially open side of the upside down G-profile may are roughened, corrugated or grooved, so that the load fastening hook 352 stays more securely put in place in the longitudinal direction of the side beam during use.

Figure 24:
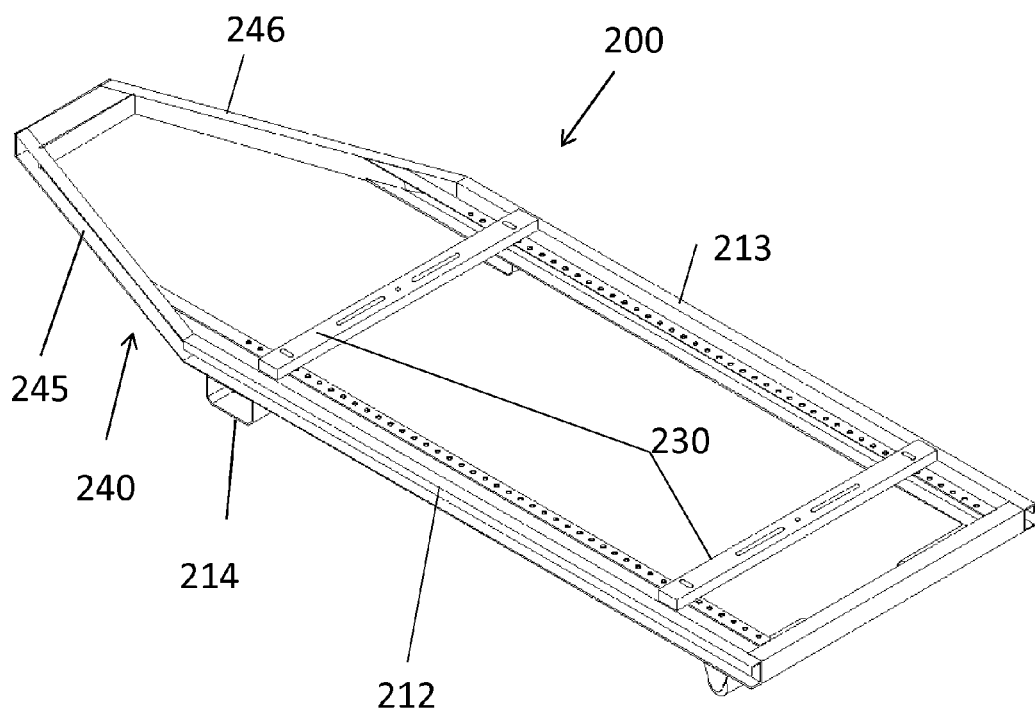
FIG. 24 represents one interchangeable platform 200 in perspective seen from side above.

Referencing to the FIG. 24, the interchangeable platform 200 may include additionally a front section 240 that tapers in longitudinal direction. The tapering front section 240 may encompass side beams 245 and 246 that are at an angle to the longitudinal direction. The front section 240 makes it possible to use a longer interchangeable platform than without tapering front section. If the interchangeable platform 200 encompasses this way forward tapering front section 240, then it is generally possible to make the interchangeable platform longer, so thus the interchangeable platform may be made longer also from the back. The backside however is advantageously wide, to make it possible that the interchangeable platform is steadily on wheel roll or roller 216 when loading or unloading. Because of the tapering front section a bigger part of the load is possible to place over the tow bar 190, then to balance the load a correspondingly bigger part of the load should be places back of the axle arrangement 101. In this case it is possible to use considerably longer interchangeable platform 200, than if the tapering front section 240 is not used. If the interchangeable platform 200 does not encompass a tapering front section, then between the interchangeable platform 200 and the vehicle pulling the transport device 500 should be left enough space to allow the vehicle turn in relation to the transport device without the front edge of the interchangeable platform meets the vehicle. In this case there will be some waste space between the front edge of the interchangeable platform 200 and vehicle. On the other hand, if the interchangeable platform 200 encompasses the tapering front section, it is possible to load the interchangeable platform considerably nearer to the vehicle. This makes it easier to transport objects like timber and boats that are long and narrow in their front part. If the interchangeable platform 200 encompasses the tapering front section 240, the skids 214 may lie as an example at the crossing point of parallel side beams 212, 213 and beams 245, 246 at the corner, or as an example in the front part of parallel side beams 212, 213. The distance between skids 214 should be at least the width of the transport device roll 166, to allow the interchangeable platform to be freely pulled to the transport device 500.

In one arrangement the interchangeable platform 200 encompasses a fastening device 202 to fasten the interchangeable platform 200 to the transport device 500. The fastening device 202 is arranged to be in longitudinal direction to the first head (front side) of the interchangeable platform 200 under the interchangeable platform 200. The fastening device 202 may are arranged, in cross direction of the interchangeable platform 200, in the middle. In one arrangement of the invention the fastening device 202 is fitted for ball fastening and the interchangeable platform 200 can be moved with a transport device 500 that has a ball 133. This kind of fastening device 202 is generally called a ball gap. In this case the interchangeable platform 200 can be moved with any transport device 500 that is equipped with a ball 133. In one example the fastening device 202 is fitted to such a ball hitch, where the ball diameter is 50 mm.

Figure 16:
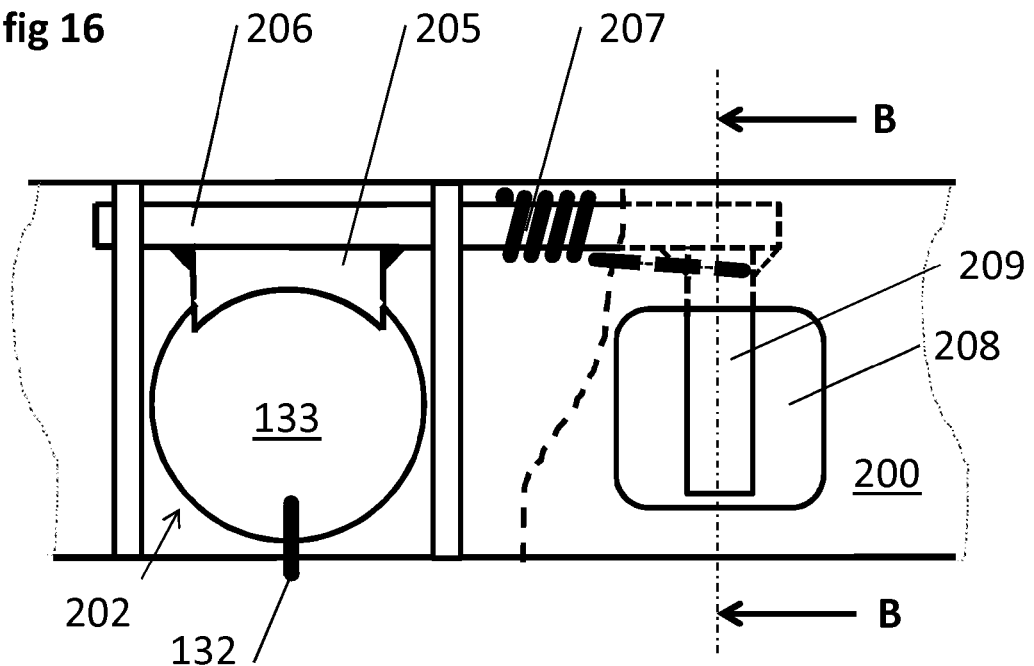
FIG. 16 represents the ball gap of the interchangeable platform 200 seen from below.
Figure 17:
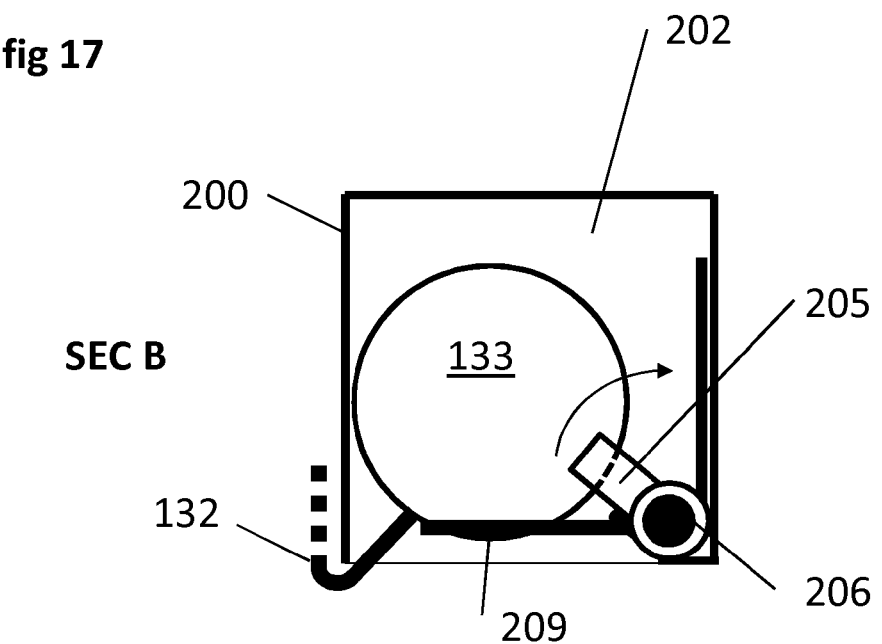
FIG. 17 represents the ball gap of the interchangeable platform 200 seen from side at the cross section plane B-B In the FIG. 16 at the ball hitch release hole.

In the FIGS. 16 and 17 there is illustrated one arrangement of ball gap in closer detail. In the FIG. 16 it is presented a ball gap 202 of an interchangeable platform 200 as seen from below. Into the ball gap it is arranged a ball 133. In the FIG. 16 the fastening device to fasten the interchangeable platform 200 to the transport device 500 encompasses additionally a ball hitch 205. The ball hitch 205 is arranged to lock the ball 133 to the ball gap 202. The ball hitch 205 is arranged to lock the ball 133 to the ball gap 202. The ball 133 is fastened to the loading cable 132. The ball hitch is attached to the axle 206 of the ball hitch. The ball hitch is arranged to turn into a position that locks the ball 133 by the ball hitch spring 207. The ball hitch 205 may be turned by an aid of its axle 206 then the locking of the ball 133 may be opened. The ball hitch 205 may be turned as an example by pressing the release of the ball hitch 209. Into the interchangeable platform there is arranged a release hole 208 for the ball hitch. Correspondingly the ball hitch release 209 is arranged to the release hole according to the FIG. 16.

In the FIG. 17 is presented a ball gap 202 of an interchangeable platform 200 as seen from below. The arrow in the FIG. 17 illustrates the direction where the ball hitch 205 turns, when the ball hitch release 209 is pressed up. The turning takes place on the axle 206.

In the FIG. 11 it is presented one interchangeable platform 200 in perspective as seen from the side, below. The figure presents in other words a ball gap 202 and the release hole 208 of the ball hitch.

In the FIGS. 10-13 it is presented one interchangeable platform. The interchangeable platform 200 includes, in addition to the parts mentioned before, a lifting eye 222, from where the interchangeable platform is arranged to be lifted. Advantageously the interchangeable platform has at least four lifting eyes 222.

The interchangeable platform 200 in the figures encompasses additionally a load stopper in the first end in longitudinal direction. This load stopper directs upwards from the interchangeable platform 200. The load stopper is arranged to support the load in a situation where the interchangeable platform decelerates greatly. The load stopper inhibits the forward movement of the load in collision. Additionally the load stopper 220 inhibits loading of the load over the edge of the interchangeable platform 200. If the load extends over the front side of the interchangeable platform, the load may hamper pulling the interchangeable platform to the roll 166 and further to the transport device 500.

The interchangeable platform 200 shown in the figures limits in its front part a latch hole 201 and a latch hole 211, that function together with the carrier 150, the limiter 154 and the latch 152 as described earlier.

The interchangeable platform 200 may include or it is possible to connect a hood to it to protect the load from environmental stress like rain, moisture and/or wind.

In the FIGS. 20-22 it has illustrated the use of an interchangeable platform as a shelf of a storage cabinet. In the FIG. 20 it is presented one storage cabinet 300 seen from front. The storage cabinet comprises vertical ladders 301 and shelf brackets. The distance between vertical ladders correspond the length L of the interchangeable platform 200 (FIG. 13), or is a bit longer. The distance between vertical ladders may be as an example about 50 mm greater than the length of the interchangeable platform 200. According to what is said before the length of the interchangeable platform may be as an example 2400 mm. Thus the distance between vertical ladders may be as an example 2450 mm. The length of the shelf holders 302 meets advantageously the width of interchangeable platform 200 W (FIG. 13). The length of shelf bracket may be a bit smaller than the width of an interchangeable platform. The length of shelf bracket may be greater than the width of an interchangeable platform. As described the width of an interchangeable platform may be as an example 1200 mm. A shelf bracket 302 may be a beam, and it may have a rectangular cross section. The width of the beam may be as an example 20 mm, 50 mm or 100 mm. The height of the beam may be as an example 50 mm, 100 mm or 150 mm. The beam may have a square cross section with side length of 100 mm.

In the FIG. 20 there are presented interchangeable platforms 200 on shelf brackets 302. In the FIG. 21 it is presented a storage cabinet like In the FIG. 20, seen from the side. As In the FIG. 22 the storage cabinet may include a limiter 303. By the limiter 303 it is possible to position the interchangeable platform 200 onto the storage cabinet.

Referencing to the FIG. 12 one form of an interchangeable platform 200 arrangement includes at least one wheel, roll or roller 216 that is arranged in to the second end, in middle, in longitudinal direction opposite of the first end and under the interchangeable platform 200. The interchangeable platform 200 comprises also a first stand, skid 214 arranged at the position under the first outer side edge of the interchangeable platform 200, and also another stand, second skid 214 arranged at the position under the second outer side edge of the interchangeable platform 200, so that the skids 214 are arranged to the first head side from the midpoint in longitudinal direction of the interchangeable platform. In order this kind of interchangeable platform can be used according to the FIG. 20 as a cabinet shelf the wheel, roll or roller 215 distance from the second end of the interchangeable platform 200 should be enough for the shelf bracket 302. As an example the distance d2 (FIG. 12) of wheel, roll or roller 216 from the second end of the interchangeable platform 200 can be at least 2 cm, advantageously at least 5 cm and optimally about 10 cm. In order this kind of interchangeable platform can be used according to the FIG. 20 as a cabinet shelf, the distance of skid 214 from the first end of the interchangeable platform 200 should be enough for the shelf bracket 302. As an example the distance d1 (FIG. 12) of the skid 214 from the first end of the interchangeable platform 200 can be at least 2 cm, advantageously at least 5 cm and optimally about 10 cm. Thus the interchangeable platform 200 can, according to the FIG. 20, be placed on two shelf bracket 302, The first shelf bracket 302 can be fitted between the wheel, roll or roller 216 and the second end of the interchangeable platform 200 and the second shelf bracket can be fitted between the interchangeable platform skid and the first end of the interchangeable platform 200.

Although it is not presented in the figures, it is possible to use the interchangeable platform 200 as a storage shelf also in such a way, that at least two shelf brackets stays between the wheel, roll or roller 216 and the skid 214. This is possible, as an example if the longitudinal distance d3 (FIG. 12) of at least other skid 214 from the wheel, roll or roller 216 is at least 40 cm, advantageously at least 100 cm, and optimally at least 150 cm. Thus the interchangeable platform 200 may be stored on at least two shelf brackets 302, that shelf brackets 302 may be fitted between the skid 214 and wheel, roll or roller 216.

The empty space between the skid 214 and wheel, roll or roller 216 can be used also when moving the interchangeable platform with a forklift or a hand pallet truck.

In one arrangement of the invention the transport device 500 does not include the unloading device. In this arrangement the transport device is arranged to function only with one described interchangeable platform. In this arrangement the transport device 500 is arranged to move forward in longitudinal direction, and includes the loading device 100 to pull the interchangeable platform 200 to the transport device 500. The transport device 500 includes additionally the first interchangeable platform guide 174 at the first side in relation to the longitudinal midpoint and the second interchangeable platform guide 174 at the second side in relation to the longitudinal midpoint, that the form of the interchangeable platform guides 174 are formed as bracket and target towards the longitudinal centre line of the transport device 500. The transport device 500 is illustrated in the FIGS. 1 and 15. Thus guides 174 of the interchangeable platform is arranged to guide one arrangement type of an interchangeable platform 200 as sidewise direction, when the interchangeable platform 200 is being moved to the transport device 500 or from the transport device 500. Guides 172, 173, 174 may are fastened to as an example to the arm 110. Guides 172, 173, 174 may be arranged from a distance off the roll 166 in front of the roll. The mentioned distance may be as an example 30 cm-90 cm, advantageously about 60 cm. The guide 174, alias a limiter 174, may be as an example like a pin, thus it has an essentially round cross section. The limiter 174 may be 16 mm thick and about 30 mm long. The longitudinal direction of the limiter 174 is essentially crosswise to the arm 110 and level when the transport device 500 is on level platform. The limiter may have other kind of cross sections. As an example the limiter 174 may have a width in the longitudinal direction of the arm that is as an example 15 mm-30 mm.

Referencing to FIGS. 4 and 5 in addition to the limiter 174, the transport device 500 may include in addition or as an alternative a side guide 173. The first side guide 173 is arranged to the first side and the second side guide 173 to the second side in longitudinal direction of the transport device. The distance between side guides is fitted to correspond the width of the interchangeable platform 200. Side guides may be formed as plane or beam. Additionally or alternatively the side guides 173 may include a roll or rolls to guide the interchangeable platform. When the transport device 500 is on level platform the side guides 173 are targeted essentially vertically. The side guides are arranged to support the interchangeable platform 200 when loading or unloading the interchangeable platform. If the side guide 173 includes rolls, the revolving axles may be essentially vertical.

Planes of planar type side guides may form an angle with the longitudinal direction. As an example the angel may be backwards opening. Thus the planes of side guides form a throat to guide the interchangeable platform into the middle of the transport device and to keep it in the middle of the transport device 500 during transport. The distance between side guides 173 at shortest corresponds to the width of the interchangeable platform 200, so that functionally sufficient play stays between side guides and the interchangeable platform. The sufficient play may be as an example 10 mm. In one example the interchangeable platform width is 1200 mm. The distance between side guides, at narrowest point of the throat (front) is in this example 1210 mm. The distance between side guides at widest point (back) is in this example 1260 mm. In this example the length of the side guides is 100 mm in the longitudinal direction of the interchangeable platform. Thus both side guides form a toe-in angle of about 14 degrees with the longitudinal direction of the transport device. In some other arrangements the toe-in angle may be as an example 10-25 degrees. The angle between the side guides 173 is double the toe-in angle.

The side beams 212, 213 of corresponding interchangeable platform 200 may be rounded or bevelled at the sides of the front side. The side beams 212, 213 of corresponding interchangeable platform 200 may are bevelled with the mentioned toe-in angle. The toe-in angle of the transport device 500 centres the interchangeable platform to the transport device effectively and the bevelled front edge of the interchangeable platform (1) prevents the interchangeable platform 200 to collide to the rear edge of the side guide in a situation where the interchangeable platform is not quite centred in cross direction and (2) helps the interchangeable platform to glide in the throat formed by side guides. As shown in the FIGS. 4 and 5 the limiter 174 may be placed in the front part of the side guide 173 in the longitudinal direction of the transport device.

Figure 14:
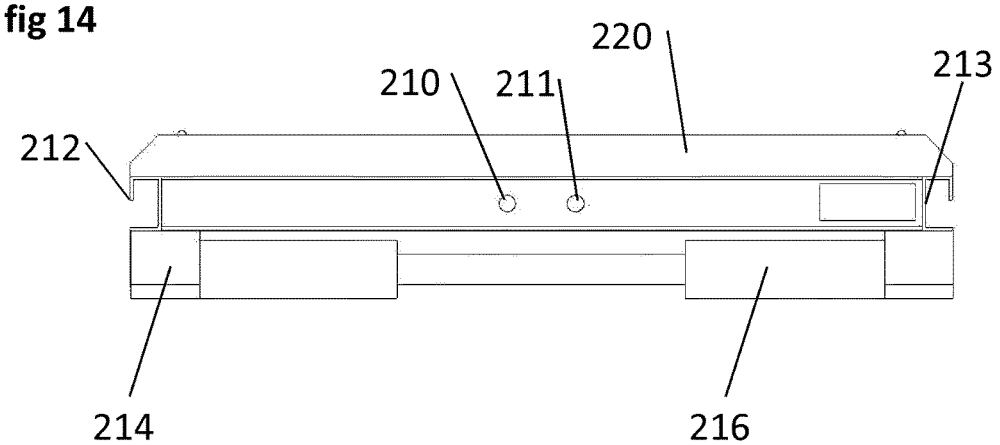
FIG. 14 represents interchangeable platform 200 In the FIG. 10 from front.

Referring to the FIG. 15, the height of side guides 173 does not advantageously exceed the upper surface of the interchangeable platform, thus the interchangeable platform may be equipped with platforms or loaded with loads that are wider than the interchangeable platform. Referring also to the FIG. 14 the height of the side guide 173 is fitted so that the limiter 174 is arranged to the slot in side beam 212, 213 as illustrated in the FIG. 15. Optimally the height of side guides is somewhat greater than the summed height of the skid 214 and the limiter 174. The height of the side guide does not need to be big, but may be so in a need. The height of the side guide 173 depends on the location of the side guide 173 in the transport device 500. In the previous example the lower edge of the side guide 173 is attached to such a height in reference to lower guide 172, that while loading or unloading the interchangeable platform, the lower edge of the skid 214 is essentially at the same height of the lower edge of the side guide 173. Essentially, at the same height, means that the lower edge of the skid 214 may be clearance higher than the lower edge of the side guide, where the clearance may be as an example 1 mm-10 mm. In one example the skid 214 height is 100 mm and the limiter 174 height is 16 mm. Additionally the clearance 4 mm between lower edge of the side beam and limiter is taken into account, thus the height of the side guide is 120 mm.

This kind of transport device 500 may include additionally a lower guide 172, that is arranged to support the interchangeable platform 200 in the vertical direction when the interchangeable platform 200 is being loaded to the transport device 500 or unloaded from the transport device 500. The lower guide may be arranged to such a height, that the lower guide is in reference to arm longitudinal direction level with the roll 166 upper side or a bit lower. In this case the roll 166 and lower guide 172 may support the interchangeable platform 200 concurrently. Lower guides may include a wheel, roll or roller. The axle of the wheel of the lower guide 172 may be horizontal, when the transport device 500 is on a level surface. This kind of orientation of the lower guide 172 targets the support of the lower guide 172 to the interchangeable platform 200 efficiently upwards. As described previously the distance between lower guides in the cross direction may correspond to distance between interchangeable platform guides 218. As described previously the distance between lower guides 172 in the cross direction may correspond to the distance between the interchangeable platform side beams 213, 213 if the side beams are closed from below. The distance between lower guides 172 in the cross direction may be as an example 500 mm-1500 mm, advantageously about 1000 mm. The lower guide may be placed a little under the limiter 174. As an example the upside of the lower guide 172 may be about 12 mm lower than the underside of the limiter 174. The lower guide 172 may be placed a little backwards from the limiter 174 in longitudinal direction of the arm 110.

The transport device 500 encompasses, as described before, a roll 166. The width of the roll is arranged according to the interchangeable platform 200, so that the width of the roll is smaller than the distance between the interchangeable platform skids 214. The width of the roll may be, as an example, at most 1000 mm. Advantageously the roll 166 is wide, to facilitate stable loading to take place as described before.

Loading of the interchangeable platform 200 the transport device takes place, as an example, according to what is described in the following:

The transport device 500 is moved backwards at most the length of the loading cable 132 from the interchangeable platform 200. The transport device 500 longitudinal direction may differ from the longitudinal direction of the interchangeable platform 200 at most 45 degrees clockwise or counter clockwise (FIG. 6)

The arm lock is opened, thus the arm may turn in relation to the chassis 510 of the transport device. In this situation the carrier 150 is at the backside of the arm 110, or can be moved to the backside of the arm.

The loading cable 132 is unwound from the loading reel 130 length that is needed by the interchangeable platform 200 distance.

The loading cable 132 is attached to the interchangeable platform 200. In one arrangement the 50 mm ball 133 (FIG. 4) at the end of the loading cable is pushed to the ball gap 202 in the front side, under, of the interchangeable platform (FIG. 11). Then the ball 133 is locked by the ball hitch 205 in the interchangeable platform 200. There is a working clearance between the ground and the ball gap i.e. because of skids 214.

The front side of the interchangeable platform 200 is risen to the back roll 166 by the loading cable 132 that goes via the mid groove 168 (FIG. 1) of the back roll 166. The task of the mid groove is to centre the interchangeable platform to the back roll 166. Thus by the balance spring 169 the first end of the arm 110 rises up pressed by the front side of the interchangeable platform. In one arrangement the first end of the arm 110 rises to its limit position, then the arm 110 makes an angle about 30 degrees (the first angle described earlier) with the chassis 510. The longitudinal direction of the interchangeable platform 200 may differ from the longitudinal direction of the transport device 500. When the longitudinal direction of the interchangeable platform 200 differs from the longitudinal direction of the transport device 500, the arm 110 may turn horizontally by the vertical hinge 182, like the vertical axle of the cross joint 180. The arm 110 may turn, as an example, so that the distance between the ball gap 202 of the interchangeable platform 200 from the vertical plane including arm 110 longitudinal direction gets smaller. If the arm 110 does not turn by itself so that the ball gap 202 is in the vertical plane including arm 110 longitudinal direction, the arm may be turned by hand The interchangeable platform 200 is pulled to the transport device 500 by reeling the loading cable 132 to the loading reel 130. The front side of the interchangeable platform 200 meets the stopper 156 after passing the roll 166.

The interchangeable platform 200 is pulled further to the transport device 500. The limiter 154 in the carrier 150 pushes to the cotter hole 210 in the front side of the interchangeable platform 200, thus locking the interchangeable platform 200 and carrier 150 together.

The interchangeable platform 200 is pulled further to the transport device 500. The latch 152 in the carrier 150 goes into the latch hole 211 in the front side of the interchangeable platform 200 and locks the interchangeable platform to the carrier 150 in the longitudinal direction of the interchangeable platform. The latch 152 is operated by sliding along the front side of the release 169. The interchangeable platform 200 moves forward supported by the carrier 150 and wheel, roll or roller 216 at the back side of the interchangeable platform. The carrier 150 is supported by the arm 110. In the initial phase the wheel, roll or roller 216 is supported by earth surface. In the beginning of the loading the back roll 166 does not touch the interchangeable platform 200 while the arm 110 is at its limit position and a bit more inclined than the interchangeable platform 200.

The interchangeable platform 200 is pulled further to the transport device 500, thus the centre of gravity of the load and interchangeable platform moves. While the centre of gravity is moving into the front of loading and unloading device 100 tilting hinge, the arm 110 sets along the bottom of the interchangeable platform 200 (guides 218 or side beams 212, 213) and the roll 166 start to bear the interchangeable platform 200. Finally the arm 110 settles to the horizontal position leaning to the cushion 199 by the balance spring 196. In one arrangement, then, the limit switch 128 of the winch 120 stops the winch 120 motor 122. Because of the limit switch 128 the tow bar 190 load that targets to the ball gap stays fixed and independent from the load. The limit switch may be passed by a control action and move the interchangeable platform further forward, thus increasing the tow bar load—

The arm lock and arm hitch are locked.

Unloading of the interchangeable platform may be accomplished as an example by following way:

The arm lock and arm hitch are unlocked.

The arm 110 is directed manually to a direction where the interchangeable platform and its load is wanted to be unloaded. The interchangeable platform is unloaded from the arm parallel to the arm and backwards in relation to the transport device. Directing may be done as needed. Directing is possible to do before the interchangeable platform wheel, roll or roller 216 hits surface of the earth, as an example when the arm 110 is level. As it is described later, the arm is tilted when unloading the interchangeable platform 200.

The winch 120 motor 122 is activated backwards, in other words, that the unloading cable 137 is tightened. In which case the unloading cable 137 pulls the carrier 150 along the arm 110 backwards. The stopper 156 of the carrier 150 pushes the interchangeable platform backwards. The interchangeable platform moves first along the arm 110 horizontally while the combined centre of gravity of loading and unloading device 100, interchangeable platform 200 and load is in the front side of the tilt hinge.

Further the winch 120 motor 122 is driven backwards. When the centre of gravity passes by the tilt hinge, the arm 110, interchangeable platform 200 and the load on it are tilted till the rolls 216 meet the ground.

Further the winch 120 motor 122 is driven backwards, in which case the carrier pushes the interchangeable platform from the transport device 500 backwards, while the transport device 500 says in place. At the same time also the gravity force to the interchangeable platform 200 caused by arm 110 and roll 166 is directed partially backwards. When the carrier meets the back end of the arm 110 the carrier stops, because of the position of the carrier and the friction clutch 134 operation the unloading reel 136 does not revolve.

The winch 120 motor 122 is still run backwards, in which case the unloading cable 137 pulls the pusher 158 in the carrier 150 backwards. The pusher 158 pushes the front side of the interchangeable platform 200 to the back side of the back roll 166.

The winch 120 motor 122 is still run backwards, in which case the interchangeable platform 200 is lowered to the ground supported by the loading cable 132 and the loading cable 132 gets slack. The arm 110, as unloaded, lowers to the level position now or later.

The ball hitch 205 is opened by the opening hole 208, thus letting the ball 133 falls out from the ball gap 202.

With the aid of the presented interchangeable platform system it is possible to store seasonal goods like snowmobiles, water jets, motor cycles and building goods and equipment on a temporary platform, like interchangeable platform 200 and to protect goods by for example a interchangeable platform 200 hood.

With the aid of presented interchangeable platform system it is possible to load the load on a interchangeable platform 200, which has an upper side essentially at low position. The upper side may be as an example only a little above wheel, roll or roller 216. Correspondingly the diameter of the wheel, roll or roller 216 may be essentially smaller than the diameter of the transport device 500 wheels. As an example the upper side height of the interchangeable platform from the surface of the earth may be under 20 cm.

The load carrying section of known utility trailers are placed over bigger wheels, causing higher loading height.

Presented interchangeable platform's 200 may be used as an example at machinery renting houses to store equipment. In equipment rental companies equipment are moved between storing, sales and maintenance locations. This kind of transport is eased significantly, if equipment is stored on a presented interchangeable platform. An interchangeable platform may be moved short distances by almost any kind of transport aid, that has fastening equipment fitted with corresponding fastening device of an interchangeable platform. As an example this kind of fastening device may be a ball 133 of the transport device. Accessories may be integrated to the interchangeable platform 200 or accessories may be placed on the interchangeable platform 200.

Presented interchangeable platforms 200 may be used as an example at work sites like building sites. At work sites equipment and materials have to be stored and moved, for example, for use, protection and work site arrangements. Equipment and material may be stored and moved by an interchangeable platform's 200. The sides of the interchangeable platform 200 protect equipment and materials when moved.

With the presented system, loading, transporting and storing of the equipment and materials can be carried out most economically. When equipment and materials are transported by and stored on interchangeable platform's 200, it is possible to speed up essentially steps associated to transporting and storing, like loading the transport device and/or unloading the transport device and/or transport to a storage and/or transport from storage because the goods are stored on the interchangeable platform 200. Additionally loads may be moved short distances by interchangeable platform 200 only. The interchangeable platform 200 is also an economical storing platform when compared to an arrangement where the goods are stored on a transport device.

The system can be applied by specifically selecting appropriate load capacity to system components and arm 110 length. The gross load capacity can be thought to be between 500 kg-5000 kg, advantageously 750 kg-2000 kg. The arm 110 length may vary between limits that are mentioned before. Correspondingly the length of the interchangeable platform 200 may range in between the limits mentioned before. The arm 110 length shall be long enough for the longest interchangeable platform in use. Short interchangeable platforms are compatible with long arms. A short interchangeable platform 200 may be pulled on a long arm 110 in a way that the beam load to the transport device is matching, in other words, the common centre of gravity of the interchangeable platform and the load is a bit front of the axle arrangement 101.

It is possible to connect fixed or removable accessories like a flatbed, side panels and a hood to an interchangeable platform 200. The width of the flatbed may be bigger than the base chassis of the interchangeable platform 200, because additional accessories sit always back and up from axle the arrangement 101.

According to one of the arrangements it is possible to use other kind of interchangeable platforms 200. When the front side of the interchangeable platform 200 is narrow, it may be loaded near the tow bar ball gap without limiting turning of a towing vehicle. The interchangeable platform 200 may thus be applied to moving and storing of boats on ground or in high storage and also launching of boats manually using a forklift or a hand pallet truck as an alternative to a vehicle. Especially one arrangement of the transport device 500 is arranged to unload the interchangeable platform by pushing it backwards. In this case it is possible to, for example, to back the transport device to water, with an interchangeable platform 200 on board and a boat as a load. After this the interchangeable platform 200, with a boat on may be pushed along the bottom of a lake, sea or river to deeper water. This way it may be possible to launch boats with big draught. When lifting a boat to the ground the interchangeable platform 200 may be taken under a floating boat. After this the boat can be fastened at least partially to the interchangeable platform 200 to pull the boat to the transport device 500. The fastening needed in transport may be later secured, when the interchangeable platform 200 and the boat are on the transport device 500.

When the system utilizes an ordinary trailer the loading/unloading device 100 may reach over the front side of the trailer load carrying section in the direction of heading near the ball gap of the trailer (FIG. 25*b*). The interchangeable platform 200 may also reach over the rear end of the trailer platform in limits defined by centre of gravity. Because of the combination of these two factors the length of the interchangeable platform may be longer than the platform of the trailer.

According to the invention the transport device 500 may be for example one of the following:
- a trailer intended to be used behind a vehicle (FIGS. 1-4, 25*a*),
- a trailer with fixed load carrying platform intended to be used behind a vehicle (FIG. 25*d*),
- a trailer with load carrying platform that can be tilted intended to be used behind a vehicle (FIG. 25*d*),
- a vehicle with a fixed load carrying section, like pick-up or truck (FIG. 25*e*),
- a vehicle with load carrying section with tilt, like pick-up or truck (FIG. 25*c*), According to the invention the loading/unloading device 100 may also be fastened to the load platform of a vehicle or trailer (FIGS. 25*b*-25*e*), thus the vehicle may encompass a chassis 510 and axle arrangement 101. If the vehicle or the trailer includes a load carrying section that can be tilted (FIGS. 25*b* and 25*c*), the vehicle or trailer encompasses also a tilt hinge 181.

In the FIGS. 26*a*1, 26*a*2 and 26*b* one arrangement of the interchangeable platform 200 is illustrated. The interchangeable platform in these figures encompasses flaps 215*a*, 215*b*, that are arranged to take two positions according to the use of the interchangeable platform. In the first position flaps are supporting the interchangeable platform, while the interchangeable platform is used as a storage shelf. In the second position flaps are moved or turned out of the way, when the interchangeable platform is used for transport together with the transport device.

Figure 26B:
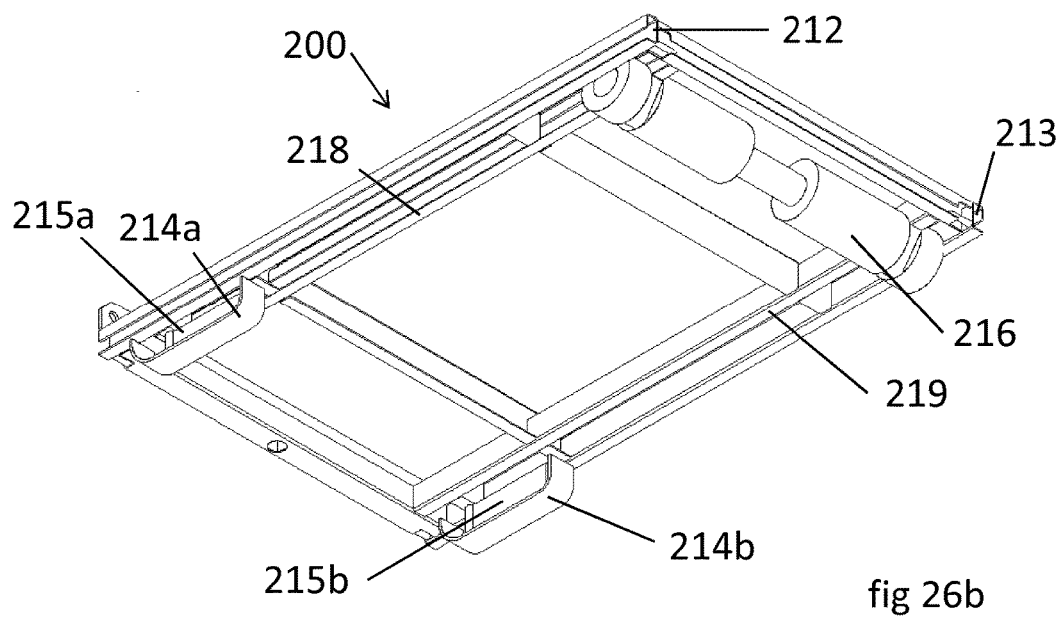

FIGS. 26*a*1 and 26*a*2 illustrate the first position, and the FIG. 26*b* the second. The interchangeable platform 200 in these figures encompasses side beams (212, 213) and two beams 218, 219 arranged between them. Like it is stated before, the interchangeable platform 200 might encompass at least one beam 218, for example at least two beams 218 and 219, or more than two beams 218. The interchangeable platform encompasses skids 214*a*, 214*b*, that are arranged at the side of the first head in longitudinal direction and under the interchangeable platform 200. The interchangeable platform 200 in the figure encompasses exactly two skids, but it is clear that the interchangeable platform may encompass at least two, likewise more than two skids. The interchangeable platform 200 encompasses a roll or roller 216 that is arranged to the second head of the interchangeable platform, opposite the first head in longitudinal direction and under the interchangeable platform 200. The interchangeable platform encompasses additionally flaps 215*a*, 215*b*. The flaps are arranged at the side of the first head in longitudinal direction and under the interchangeable platform 200.

In the FIGS. 26*a*1 and 26*a*2 flaps are arranged in the first position. The FIG. 26*a*2 is an enlargement of the area XXVIa2 In the FIG. 26*a*1. Based on FIGS. 26*a*1 and 26*a*2 it is clear that the flap (215*a*, 215*b* has an elongated form, thus the flap has a longitudinal direction. In this first position, the flap (215*a*, 215*b*) points essentially perpendicularly in reference to the interchangeable platform beam's 218 direction or forms at least an angle of 60 degrees with the beam 218. As an example in the first position, the flap (215*a*, 215*b*) points essentially perpendicularly to the longitudinal direction of the interchangeable platform 200.

As an example the longitudinal direction of a flap 215*b* (or 215*a* correspondingly) forms an angle of at least 60 degrees with the beam 218. Here the angle means the smaller angle (in a plane) formed by two crossing lines. The flap (215*a*, 215*b*) is attached pivotally to one part of the interchangeable platform, like a side beam (212, 213) or skid (214*a*, 214*b*) or a flap support 217, that is attached to one or another of these (212, 213, 214*a*, 214*b*) and/or guide (218, 219). The pivotal connection mentioned may be formed as an example of a vertical hinge 221 (FIG. 26*a*2) or similar elements. In one arrangement the flap or flaps can be locked to the first position mentioned.

Figure 27A:
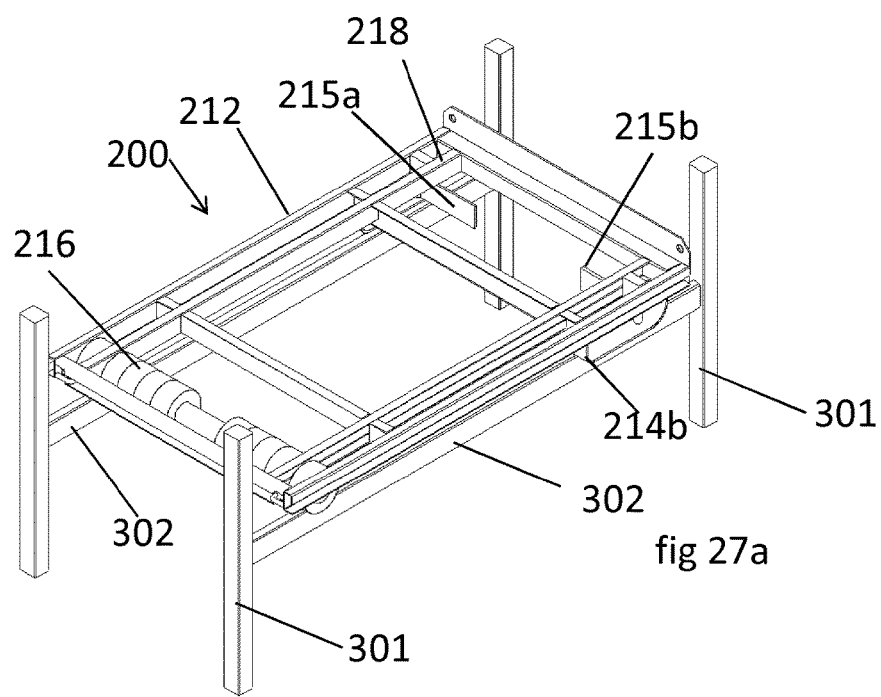
FIG. 27a represents an interchangeable platform on shelf rackets in perspective and FIG. 27b represents an interchangeable platform on shelf brackets seen from side.

In this first position the flaps 215*a*, 215*b* are arranged to support the interchangeable platform while the interchangeable platform is used as a storage shelf (FIG. 27*a*). A flap may for example support a guide (218, 219). In the FIGS. 26*a* and 26*b* part of the flap 215*a*, 215*b*) stays under the guide (218, 219) in vertical direction. By the vertical direction of an interchangeable platform it is meant the perpendicular to a plane including both side beams (212, 213). Advantageously part of the flap (215*a*, 215*b*) stays under the guide (218, 219) in the vertical direction of the interchangeable platform so that part of the flap is opposite to each other in the mentioned vertical direction with the guide. In this case one part of the flap has the same coordinates in the mentioned plane with one part of the guide but the coordinates aligning with the perpendicular direction of the plane of the interchangeable platform 200 are different than the guide part has. Thus in a storage shelf use according to the FIG. 27*a*, the flap 215 stays between the guide 218 and a shelf bracket 302.

The height of the flap, Hs, is fitted so that it has roughly about the same height as the roll 216, and at the same time the height of the skids 214. The height of the skids 214 and the roll 216 is fitted so that under the mid part of the interchangeable platform there is enough space for lifter forks. In the arrangement the skid (214*a*, 214*b*) height is about 100 mm, like 90 mm-110 mm, like 95 mm-105 mm. As a concept the height of a skid is defined before. In the illustration the skid is formed from a bent sheet, with thickness of some millimetre, like 2 mm-7 mm or 3 mm-6 mm, or 5 mm. In the arrangement of the illustration the height of the flap, Hs, is as an example 2 mm-20 mm shorter comparing to the height of the skid, like 3 mm-10 shorter comparing to the height of the skid, like 3 mm-7 mm shorter comparing to the height of the skid. In this case the flap can be turned, even if the interchangeable platform would stand on skids on a flat surface. The height Hs may be for example about 85 mm, about 90 mm, about 95 mm, about 100 mm or about 105 mm. Correspondingly the height of the skid may be about 90 mm, about 95 mm, about 100 mm, about 110 mm, about 105 mm or about 110 mm. Correspondingly the elevation made by the roll 216 is about 100 mm, like 90 mm-110 mm, like 95 mm-105 mm. These choices have the advantage that the interchangeable platform 200 can be handled with an ordinary forklift, but is still not very high. As illustrated In the FIG. 26*a*2, in one arrangement the flap 215*b* (and 215*a*) is at its first position arranged to lean on the guide (218, 219); in other words the momentum to the flap 215 caused by the shelf bracket 302 (FIG. 27*a*) is at least partially cancelled while the flap 215 leans on the guide 218. In the FIG. 26*a*2 the flap 215*b* (and 25*a*) is at its first position arranged to be leaning on the guide at the whole width of the guide (218, 219).

Like stated, at its first position, the function of the flap 215*a*, 215*b* is to support the interchangeable platform 200, while the interchangeable platform 200 is used as a storage shelf. The load carrier can be lifted on the shelf brackets 302 (like two shelf brackets 302, FIG. 27*a*) as an example by a forklift, in which case the flap 215 leans to the mentioned shelf bracket 203. The shelf bracket 302 may for example an elongated bar that points to a first direction horizontally. The interchangeable platform can be lifted on to the shelf brackets so that the longitudinal direction of the interchangeable platform is essentially parallel with the mentioned first direction; or forms only a small angle (for example less than 10 degrees) with the mentioned direction, like it is presented In the FIG. 27*a*. In this kind of use the interchangeable platform leans on two shelf brackets 302, at its first head on the flaps 215*a* 215*b* and at its second head on the roll 216. Because of this, a roll is advantageous arrangement when compared to relatively thin axle and a wheel, as the roll by its thickness acts as a supporting structure to the interchangeable platform 200. The roll 216 is not necessarily smooth at diameter, nor it has necessarily a round cross section everywhere. Advantageously the roll (or roller) 216 dimension, (like diameter) is on average at least 40 mm to strengthen the structure. Advantageously the roll 216 dimension (like diameter) is also on its widest point within limits presented before, advantageously at most 180 mm; like at most 150 mm or at most 100 mm, to keep the load carrier height low. Advantageously the roll or roller 216 is essentially as wide as the interchangeable platform. The width of the roll may be for example at least 75% of the width of the interchangeable platform or at least 90% of the width of the interchangeable platform. This kind of continuous roll or roller further makes the interchangeable platform more rigid. Pallet shelf unit commonly in use encompasses vertical shelf ladders 301 and horizontal shelf brackets 302 mounted on them. Distance between the shelf brackets, from the centre of the first support to the centre of the second support, is generally about 1000 mm. The distance between outer edges of the shelf brackets may be for example 900 mm-1100 mm; and the distance between inner edges for example 800 mm-1000 mm.

The load carrier 200 can be lifted on the support of the shelf brackets 302 (like two shelf brackets), thus the loading direction of the interchangeable platform 200 is crosswise in relation to shelf brackets 302. Loading can be done for example by a forklift. In this case it is advantageous, that the length of the flaps 215*a*, 215*b* Ls (FIG. 26*a*2) is such that it lets enough allowance in relation to the shelf brackets. Advantageously the length of the flap 215*a*, 215*b* is at least 200 mm, like at least 250 mm, and optimally 250 mm-350 mm.

In the FIG. 26*b* the flaps are arranged into the second position. In the mentioned second position the flaps 215*a*, 215*b* are essentially parallel with the longitudinal direction of the interchangeable platform 200. As an example in the second position the longitudinal direction of the flap 215b (or correspondingly 215a) forms an angle with longitudinal direction of the interchangeable platform 200 that is at most 30 degrees. The essential part is that in the mentioned second position the flap 215a, 215b in not even partially opposite to each other with the guide 218, 219. When the flaps are not opposite to each other with a guide (or guides) in a way mentioned, the flaps 215a, 215b are not in the way when pulling the interchangeable platform to its transport device 500 along the corresponding transport device roll 166 (for example FIG. 1). The flaps 214 may be linked in such a way according to FIGS. 26a1, 26a2, 26b, that in its second position the flap 215a, 215b points from the vertical hinge 221 towards the back of the interchangeable platform, like towards the roll 216. In this case the flaps are linked to a point that is nearer the front part of the skid 214 than the back part of the skid. Thus a relatively long flap 215 can be turned opposite to each other with the skid 214 or backwards inside the skid. The turning force may be created by transport device 500, when the interchangeable platform 200 is pulled to the transport device (see FIG. 15). Naturally it would be possible to link flaps 215 in a way that they would be pointing forward from the vertical hinge 221 in the second position (not presented in the figure).

Advantageously the relative positioning of flaps 215a, 215b and skids 214a, 214b to each other is arranged to be such, that in the mentioned second position both flaps 215a, 215b (one at a time) is arranged into the space limited by a skid (214a, 214b) and a corresponding side beam (212, 213). As an example in the FIG. 26b the flap 215b is arranged into the space limited by the skid 214b and the side beam 213. In the FIGS. 26a1, 26a2, 26b the skid is hollow and has an opening at least towards the longitudinal centre line of the interchangeable platform 200. Thus the flap 215a, 215b can be turned by its joint into the hollow skid. The skid 214 may be hollow also away from the longitudinal centre line of the interchangeable platform 200, what is presented In the FIGS. 26a1, 26a2 and 26b. The mentioned joint may encompass a hinge cotter and/or a vertical hinge 221. Also the hinge cotter and/or the vertical hinge 221 is arranged In the figures into a space limited by the skid (214a, 214b) and corresponding side beam (212, 213). In one arrangement a flap or flaps may be locked into the mentioned first and second position. Locking may be done as an example by a cotter, tightened screw or by the friction of a cotter pin and/or the vertical hinge 221.

In one arrangement the cotter pin and/or the vertical hinge 221 is positioned between the longitudinal edge of the interchangeable platform and the guide 218 nearest to the mentioned longitudinal edge. The distance of the cotter pin and/or the vertical hinge 221 from the longitudinal edge of the interchangeable platform may be for example less than 90 mm, less than 80 mm or less than 60 mm. The distance of skids 214a, 214b in the cross direction of the interchangeable platform is advantageously at least 900 mm, preferably at least 1000 mm like at least 1100 mm. Thus in shelf use, shelf brackets 302 at distance of about 900 mm or about 1000 mm from each other stay between the skids 214a, 214b according to FIG. 27.

According to what is described before, one arrangement of the interchangeable platform encompasses
- side beams 212, 213 and at least one guide 218,
- at least one flap (215a, 215b), that has longitudinal direction, that flap is arranged to be in its first position at the first moment and in its second position at another moment, where in the first position the longitudinal direction of the flap (215a, 215b) forms an angle with the longitudinal direction of the interchangeable platform 200, that is at least 60 degrees and at least a part of the flap stays under the guide (218, 219) and at least part of the flap is vertically opposite to each other with the guide (218, 219) and in the second position the flap (215a, 215b) is not even partially opposite to each other with the guide (218, 219), where the flap or flaps (215a, 215b) are arranged in the longitudinal direction of the interchangeable platform 200 to the first head side from the midpoint and under the interchangeable platform 200, and the interchangeable platform encompasses additionally a roll or a roller 216, that is arranged in the longitudinal direction of the interchangeable platform 200 from the midpoint to the second head side, opposite to the first head, and under the interchangeable platform 200.

Advantageously side beams 212, 213 according to FIGS. 26a1, 26a2, 26b have opening to the side and have an upside down G-profile. Thus the load on the interchangeable platform 200 can be fastened by load straps that are fastened to the G-profile as described before. Additionally the load may be, as described earlier, fastened all the time, while the interchangeable platform is being loaded to the transport device, unloaded from the transport device and stored as a storage shelf. This way the load fastening does not need to be opened in between these steps.

Figure 27B:
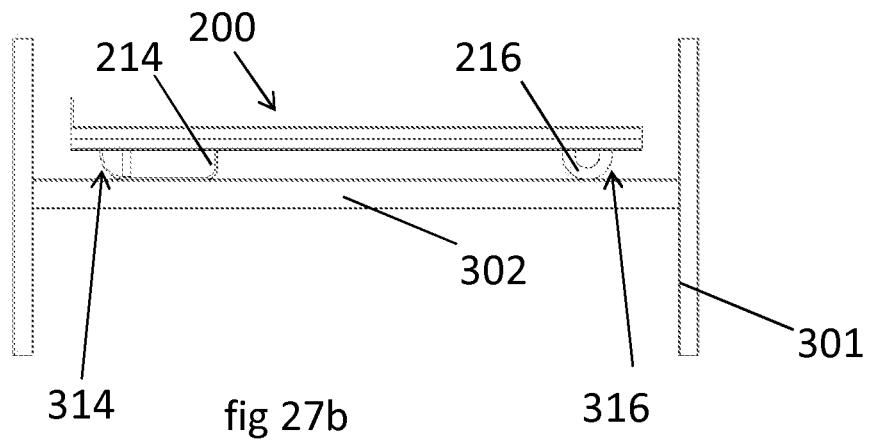

In the FIG. 27b there is the interchangeable platform 200 seen from the side on shelf brackets 302. In this arrangement the front side profile 314 of the skid 214 corresponds to the back side profile 316 of the roll 216. This arrangement provides the advantage that the interchangeable platform can be stacked on a platform, which form is fitted to the shape of the underside of the interchangeable platform. The interchangeable platform can be stacked additionally in a way, that the longitudinal direction from the backside to the front side has certain orientation, and also in a way that the longitudinal direction from the backside to the front side has certain orientation opposite to the first orientation mentioned. As the mentioned platform, it is possible to use, for example, a shipping container roof or an interchangeable platform hood top. Therefore interchangeable platforms can be stacked on one another, for example, on hood tops of other interchangeable platforms, and stacking can be done in such a way that the orientation of interchangeable platforms can be the same or opposite with each other. Additionally each stack may contain interchangeable platforms orientated both in one direction and the opposite direction.

The backside profile 316 of the roll 216 corresponds an arc of a circle. In the FIG. 27b the front side profile 314 of the skid corresponds the same arc. If the axle of the roll is far from the interchangeable platform, then the mentioned arc angle is more than 90 degrees, thus the front side profile of the skid 214 may be a quarter of a circle added with a line that goes from the front part of the arc towards the interchangeable platform in a direction perpendicular to the plane of interchangeable platform. Optionally also in this case the front side profile of the skid 214 may correspond the previously mentioned arc of a circle. Additionally the radius of a circular profile of the front side of the skid corresponds to the radius of the roll 216.

Previously, the concept of the gravity support force has been presented. This refers to the force that the transport device 500 directs to the load to cancel the force that the gravity directs to the mentioned load. If the load is accelerating, for example, while unloading the load by tilting, the mentioned support force cancels the gravity only partially.

Earlier some arrangements of the invention have been presented. The invention is not limited to these, but can be applied within the following patent claims.

Previously it has thus been presented for example the following:

EXAMPLE A1

A transport device (500), that is arranged to be moveable forward in one first direction, and that transport device includes
  a chassis (510), and
  a loading equipment (100) to pull the interchangeable platform (200) on to the transport device (500) at another, second direction, and that direction forms a sharp angle together with the first direction and that transport device (500)
  is arranged to direct the gravity support force to the interchangeable platform (200),
  Is characterized in that
  the transport device (500) encompasses an unloading device (100), that is arranged to direct, in addition to the gravity support force, a force to the interchangeable platform (200) that
  the direction of that force forms an obtuse angle or a straight angle with the first direction;
in which case the transport device (500) is arranged to unload the interchangeable platform (200) from the transport device (500) backwards along the transport device (500) with the aid of the unloading device (100).

EXAMPLE A2

A transport device (500) compatible with the example A1, characterized in that the transport device (500) encompasses one common loading and unloading device (100), in which case the combined count of the loading and unloading devices is one, which loading and unloading device (100) is arranged to pull the interchangeable platform to the transport device (500) and unload the interchangeable platform from the transport device (500).

EXAMPLE A3

A transport device (500) compatible with the example A1 or A2, characterized in that the transport device (500) encompasses
  an apparatus to fasten the interchangeable platform (200) to the transport device 200 and
  the mentioned apparatus includes a ball (133);
in which case the interchangeable platform (200) that can be fastened to the transport device (500) can be fastened also to other transport devices equipped with a ball (133).

EXAMPLE A4

A transport device (500) compatible with one of the examples A1-A3, of which longitudinal direction is at the mentioned first direction, characterized in that the transport device (500) encompasses
  an arm (110), that points or can be pointed to a direction, that belongs to a vertical plane that includes the longitudinal direction of the transport device,
  a tilt hinge (181), with which the arm (110) is attached to the chassis (510) so it can pivot, so that the first head of the arm (110) is arranged to move in the vertical direction in relation to the chassis (510) while the transport device is at level support,
  an apparatus to fasten the interchangeable platform (200) to the loading or to the combined loading and unloading device (100),
  at least one winch (120) to move fastening devices of the interchangeable platform (200) in the direction of the arm (110) forward and backward,
  at least one cable (132, 137) to deliver force from the winch (120) to the fastening devices of the interchangeable platform (200) and
  at least one roll (166) to guide the interchangeable platform (200) and/or cable (132, 137);
in which case the transport device (500) is arranged to pull the interchangeable platform (200) to the transport device (500) and unload the interchangeable platform (200) from the transport device (500) backwards by the pivoting arm (110) and the winch (120).

EXAMPLE A5

A transport device (500) compatible with example A4, characterized in that
  the roll (166) width is over 800 mm;
in which case the interchangeable platform (200) can be pulled to the transport device (500) or unloaded from the transport device (500) steadily.

EXAMPLE A6

A transport device compatible with one of the examples A1-A5, characterized in that the transport device (500) encompasses
  a balance spring (196), like a gas spring, with which the arm (110) is arranged at an angle relative to the chassis (510), when the momentum of the vertical force stays under the limit defined by the balance spring (196).

EXAMPLE A7

A transport device (500) compatible with one of the examples A4-A6, characterized in that the transport device (500) encompasses
  a vertical hinge (182), with which the arm (110) is arranged to pivot in relation to the chassis (510) in a such way, that the first head of the arm (110) is arranged to move horizontally in relation to the chassis (510) when the transport device (500) is on level base.

EXAMPLE A8

A transport device (500) compatible with one of the examples A4-A7, that encompasses a wheel (103), so that the wheel (103) is arranged to support the transport device (500) to the surface of the earth, and the wheel (103) is arranged to the axle arrangement (101) to rotate, characterized in that
  the mentioned roll (166) is arranged back of the axle arrangement (101) of the wheel (103), backwards in relation to the first direction.

EXAMPLE A9

A transport device (500) compatible with one of the examples A4-A8, characterized in that the transport device (500) encompasses
  a carrier (150), that includes
  a pusher (158), that is arranged to push the interchangeable platform (200) from the roll (166).

EXAMPLE A10

A transport device (500) compatible with one of the examples A4-A9, characterized in that the transport device (500) encompasses
  equipment (122, 126, 128) to steer the winch (120) and
  the winch (120) is arranged to use information at least from one of the following
  the angle between the arm (110) and the chassis (510)

the mass of the load and
the momentum caused by the load and/or the interchangeable platform (200) and/or the arm (110)

EXAMPLE A11

A transport device (500) compatible with one of the examples A4-A10, characterized in that the transport device (500) encompasses at least one of the following:
an apparatus, like a latch (152), a carrier (150) and an arm latch, to lock the longitudinal position of the interchangeable platform (200) in relation to the arm (110),
an apparatus, like a limiter (154), a carrier (150) and an arm latch, to lock the transversal position of the interchangeable platform (200) in relation to the arm (110),
means to fasten the interchangeable platform (200) to the chassis (510), the arm (110) or guides (173, 174);
in which case the interchangeable platform can be locked on its position for transport.

EXAMPLE A12

A transport device (500) compatible with one of the examples A4-A11, characterized in that the transport device (500) encompasses
a loading reel (130) for a loading cable (132) and
an unloading reel (136) for a unloading cable (137),
the loading reel (130) and the unloading reel (136) are arranged to rotate mutually in the same direction around a rotating axle,
the unloading point of the loading cable (132) from the loading reel (130) is arranged to the first side of the rotating axle and
the unloading point of the unloading cable (137) from the unloading reel (136) is arranged to the other side of the rotating axle, opposite to the first side;
in which case while the loading reel (130) and unloading reel are rotating the first reel (130, 136) reels the cable (132, 137) to the first reel (130, 136) and the second reel (136, 130) unwinds the cable (137, 132) from the second reel (136, 130).

EXAMPLE A13

A transport device (500) compatible with one of examples A4-A12, characterized in that the transport device (500) encompasses
an arm lock to lock the arm (110) to the chassis;
in which case the arm (110) can be locked on its position, for example, for transport.

EXAMPLE A14

A transport device (500) compatible with one of the examples A4-A13, characterized in that the transport device (500) is one of the following
a trailer to be used behind a car,
a utility trailer with a fixed load platform to be used behind a car
a utility trailer with a load platform with a tilt to be used behind a car
a vehicle with a fixed load platform and
a vehicle with a load platform with a tilt.

EXAMPLE A15

A transport device (500) compatible with one of the examples A4-A14, characterized in that the transport device (500) encompasses
a loading reel (130) to reel the loading cable (132) in or out,
an unloading reel (136) to reel the unloading cable (137) in or out,
a winch (120) to rotate the loading reel and the unloading reel,
a one way clutch (135), that allows the loading reel (130) freely rotate in relation to the unloading reel (136) only in one, fixed, first direction, but when the loading reel (130) is rotating in the opposite direction, the loading reel (130) transfers the momentum to the unloading reel (136),
that one way clutch (135) is arranged in a way that, when loading the loading reel (130), momentum is not transferred to the unloading reel (136);
in which case all momentum of the the winch (120) can be used to pull the interchangeable platform (200) while loading.

EXAMPLE A16

A transport device (500) compatible with one of examples A4-A15, characterized in that the transport device (500) encompasses
a friction clutch (134) to limit or prevent rotation of the unloading reel (136).

EXAMPLE B1

An interchangeable platform (200) that encompasses
a first side beam (212) at its first side, that side beam (212) defines a plane,
on the opposite side, another side beam (213), that is arranged to the mentioned plane, thus side beams (212, 213) define the longitudinal direction of the interchangeable platform (200), that longitudinal direction is at the mentioned plane and stays between the angle formed by side beams (212, 213) or is parallel with side beams (212, 213),
the first side beam (212) forms an angle with the longitudinal direction that is less than 30 degrees,
second side beam (213) forms an angle with the longitudinal direction that is less than 30 degrees, and the interchangeable platform (200) encompasses
at least one support structure (230) with which the first (212) and second side beam (213) are fastened to each other,
characterized in that
the first side beam (212) is, into sideways direction, perpendicular to the longitudinal direction, in relation to the second side beam (213) into opposite direction, at least partially open and closed from up and down and
the second side beam (213) is, into sideways direction, perpendicular to the longitudinal direction, in relation to the first side beam (212) into opposite direction, at least partially open and closed from up and down;
in which case the interchangeable platform (200) can be steered by side beams (212, 213) to the transport device (500) of the interchangeable platform and the load can be fastened to side beams (212, 213).

EXAMPLE B2

An interchangeable platform (200) compatible with the example B1, characterized in that
the cross section of the first (212) and the second side beam (213) is an upside-down G-profile;
in which case the load fastening apparatus can be locked to the side beam (212, 213).

EXAMPLE B3

An interchangeable platform (200) compatible with the example B1 or B2, characterized in that
(ia) side beams (212, 213) have parallel parts or
(ib) side beams (212, 213) are parallel;

in which case parallel parts of the side beams (212, 213) define the longitudinal direction of the interchangeable platform (200), that is parallel with the side beams or with parallel parts of the side beams, and (ii) parallel parts of side beams (212, 213) are opposite to each other at the longitudinal direction mentioned;

in which case the interchangeable platform can be steered to its transport device and can be locked to the transport device by the parallel parts opposite to each other.

EXAMPLE B4

An interchangeable platform (200) compatible with one of the examples B1-B3, characterized in that the interchangeable platform (200) encompasses additionally a front section (240) that narrows in longitudinal direction, that the front section (240)

is firmly fixed to or can be detached from the chassis of the interchangeable platform (200).

EXAMPLE B5

An interchangeable platform (200) compatible with one of the examples B1-B4, characterized in that the interchangeable platform (200) encompasses at least one extension module, to fit the length of side beams (212, 213) according to use.

EXAMPLE B6

An interchangeable platform (200) compatible with one of the examples B1-B5, characterized in that the interchangeable platform (200) encompasses a fastening device (202) to fasten the interchangeable platform (200) to the transport device (500) of the interchangeable platform and the fastening device (202) is arranged in the longitudinal direction of the interchangeable platform (200) to the first head of the interchangeable platform (200) under.

EXAMPLE B7

An interchangeable platform (200) compatible with the example B6, characterized in that the mentioned fastening device (202) is a ball gap (202); in which case the mentioned fastening device (202) is fitted for a ball fastening and the interchangeable platform (200) can be moved with the transport device (500), which has a ball (133).

EXAMPLE B8

An interchangeable platform (200) compatible with one of the examples B1-B7, characterized in that the interchangeable platform (200) encompasses at least one wheel, roll or roller (216), that is arranged to the second head side from the midpoint in longitudinal direction of the interchangeable platform (200) opposite to the first head under the interchangeable platform (200);

in which case the interchangeable platform (200) can be moved by the mentioned wheel, roll or roller (216).

EXAMPLE B9

An interchangeable platform (200) compatible with the example B8, characterized in that the diameter of the wheel, the roll or the roller (216) is at most 180 mm;

in which case the interchangeable platform (200) is low and takes only little storage space while stacked.

EXAMPLE B10

An interchangeable platform (200) compatible with the example B8 or B9, characterized in that the wheel, roll or roller (216) is arranged to the interchangeable platform (200) in such a way that the wheel, roll or roller (216) is completely at a lower level than the plane defined by upper side of the interchangeable platform, in which case the interchangeable platform can be covered by a load platform that goes over the wheel, roll or roller (216).

EXAMPLE B11

An interchangeable platform (200) compatible with one of the examples B1-B10, characterized in that the interchangeable platform (200) encompasses at least one guide (218), that is arranged under the interchangeable platform (200) and between the first (212) and the second (213) side beam;

in which case the interchangeable platform (200) can be moved, supported by at least one guide (218), to its transport device (500) or from its transport device (500).

EXAMPLE B12

An interchangeable platform (200) compatible with the example B11, characterized in that the interchangeable platform (200) encompasses a first stand like skid (214) or wheel arranged to the first outer edge, under the interchangeable platform (200) and a second stand like skid (214) or wheel arranged to the second outer edge, under the interchangeable platform (200) so that both stands are arranged to the first head side form the midpoint in the longitudinal direction, which stands have a length fitted so that while the interchangeable platform is on level base, the upper side of the interchangeable platform (200) is essentially level and the distance between the stands is fitted so that the mentioned at least a part of at least one guide (218) stays between stands;

in which case the interchangeable platform (200) can be moved, supported by the mentioned guide, to its transport device (500) or from its transport device (500) without the stands impair moving.

EXAMPLE B13

An interchangeable platform (200) compatible with one of the examples B1-B10, characterized in that the first and the second side beam (212, 213) are closed from below; in which case the interchangeable platform (200) can be moved to its transport device (500) or from its transport device (500) by the mentioned side beams (212, 213).

EXAMPLE B14

An interchangeable platform (200) compatible with the example B13, characterized in that the interchangeable platform (200) encompasses a first stand like skid (214) or wheel arranged to the first outer edge, under the interchangeable platform (200) and a second stand like skid (214) or wheel arranged to the second outer edge, under the interchangeable platform (200) so that both stands have are arranged to the first head side form the midpoint in longitudinal direction, which stands have a length fitted so that while the interchangeable platform is on level base, the upper side of the interchangeable platform (200) is essentially level and the distance between the stands is fitted so that the mentioned at least part of one guide (218) stays between stands;

in which case the interchangeable platform (200) can be moved to its transport device (500) or from its transport device (500) by the mentioned first and second side beams (212, 213) without the stands impair moving.

EXAMPLE B15

An interchangeable platform (200) compatible with one of the examples B1-B14, characterized in that the interchangeable platform (200) encompasses stands like skids (214) or wheels, that stands are arranged to the first head side form the midpoint in longitudinal direction, under the interchangeable platform (200), the length of those stands is at least 80 mm;

in which case the interchangeable platform (200) can be moved by, for example, a forklift.

EXAMPLE B16

An interchangeable platform (200) compatible with one of the examples B1-B15, characterized in that the interchangeable platform (200) encompasses at least one wheel, roll or roller (216), that is arranged to the second head opposite to the first head of the interchangeable platform, in longitudinal direction back from the midpoint of the interchangeable platform (200) and under the interchangeable platform 200 and a first skid (214) arranged to the first outer edge, under the interchangeable platform (200) and a second skid (214) arranged to the second outer edge, under the interchangeable platform (200), which skids are arranged to the first head of the interchangeable platform, in longitudinal direction front from the midpoint in longitudinal direction of the interchangeable platform (200), which at least one of the skids (214) has at least 40 cm distance from the mentioned wheel, roll or roller (216), in longitudinal direction of the interchangeable platform (200), in which case the interchangeable platform (200) can be stored by two shelf brackets (302), that shelf brackets (302) may be fitted between at least one skid (214) and a wheel, a roll or a roller (216).

EXAMPLE B17

An interchangeable platform (200) compatible with one of the examples B1-B15, characterized in that the interchangeable platform (200) encompasses at least one wheel, roll or roller (216), that is arranged to the second head opposite to the first head of the interchangeable platform, in longitudinal direction back from the midpoint of the interchangeable platform (200) and under the interchangeable platform 200 and a first stand like first skid (214) arranged to the first outer edge, under the interchangeable platform (200) and second stand like skid (214) arranged to the second outer edge, under the interchangeable platform (200), which stands are arranged in longitudinal direction of the interchangeable platform front from the midpoint to the first head side of the interchangeable platform (200), so that the distance of wheel, roll or roller (216) from the second head of the interchangeable platform (200) is at least 2 cm and the distance of stands from the first head of the interchangeable platform (200) is at least 2 cm;

in which case the interchangeable platform (200) can be stored by two shelf brackets (302), the first shelf bracket (302) can be fitted between wheel, roll or roller (216) and the second head of the interchangeable platform (200) and the second shelf bracket (302) can be fitted between the stand and the first head of the interchangeable platform (200).

EXAMPLE B18

An interchangeable platform (200) compatible with one of the examples B1-B17, characterized in that the interchangeable platform (200) encompasses in first head in longitudinal direction arranged a load stopper (220) that directs upwards from the interchangeable platform (200);

in which case the load stopper (220) prevents the load moving forward at, for example, in an event of collision.

EXAMPLE B19

An interchangeable platform (200) compatible with one of the examples B1-B18, characterized in that the interchangeable platform (200) encompasses a hood to protect the load from environmental stress, like rain, moisture and/or wind.

EXAMPLE B20

A transport device (500), that is arranged to be movable forward in the longitudinal direction and encompasses a loading device (100) to pull the interchangeable platform (200) to the transport device (500), characterized in that the transport device (500) encompasses additionally the side guides (173, 174) to guide the interchangeable platform (200) according to the example B1 to the transport device (500) in the transversal direction of the interchangeable platform (200);

in which case the guides (173, 174) of the interchangeable platform (200) is arranged to guide the interchangeable platform (200) according to the example B1 in the transversal direction while the interchangeable platform (200) is moved to the transport device (500) or from the transport device (500).

EXAMPLE B21

A transport device (500) compatible with the example B20, characterized in that the transport device (500) encompasses a first side guide (174 at the first side in relation to the longitudinal median line and a second side guide (174) at the second side in relation to the longitudinal median line, that guides (173, 174) are formed as lugs and direct towards the longitudinal centre line of the transport device (500);

in which case the guides (173, 174) are arranged to guide the interchangeable platform (200) according to the example B1 in the transversal direction while the interchangeable platform (200) is being moved to the transport device (500) or from the transport device (500) and the guides (173, 174) can be used to fasten the interchangeable platform to its transport device (500)

EXAMPLE B22

A transport device (500) compatible with the example B20 or B21, characterized in that the transport device (500) encompasses a first side guide (173) at the first side in relation to the longitudinal direction of the transport device (500) and a second side guide (173) at the second side in relation to the longitudinal direction of the transport device (500), that side guides (173) are planar and direct essentially vertically when the transport device (500) is at a level platform and the planes of planar side guides (173) form an angle with the longitudinal direction of the transport device (500);

in which case the planes of guides form a throat to guide the interchangeable platform (200) to the middle of the transport device (500).

EXAMPLE B23

A transport device (500) compatible with one of the examples B20-B22, characterized in that the transport device (500) encompasses additionally a lower guide (172) that is arranged to support the interchangeable platform (200) in vertical direction while the interchangeable platform (200) is moved to the transport device (500) or from the transport device (500).

EXAMPLE B24

A transport device (500) compatible with B23, characterized in that the lower guide (172) encompasses a wheel, roll or roller, the rotating axle of which is horizontal when the transport device (500) is at level support;

in which case the orientation of the lower guide (172) targets its support to the interchangeable platform (200), efficiently upwards.

Additionally the transport device (500) may encompass features described in any of the examples A1-A16.

The invention claimed is:

1. A transport device, that is arranged to be moveable in a first direction forward, and which transport device comprises:
    a chassis, and
    a loading device to pull an interchangeable platform to the transport device in another direction that forms a sharp angle with the first direction, and which transport device is arranged to target a gravity support force to the interchangeable platform,
    wherein the transport device comprises an unloading device that is arranged to target in addition to the gravity support force to the interchangeable platform a force, of which direction forms an obtuse angle or straight angle with the first direction;
in which case the transport device is arranged to unload the interchangeable platform from the transport device backwards along the transport device with the aid of the unloading device, the transport device further comprising
    an arm that is directed or can be directed into such direction that it belongs to a vertical plane encompassing a longitudinal direction of the transport device,
    a vertical hinge, by which the arm is arranged to pivot with reference to the chassis, so that a first end of the arm is arranged to be movable in relation to the chassis in a horizontal direction when the transport device is on a horizontal surface; in which case the interchangeable platform can be moved to the transport device and/or from the transport device in a direction that is not parallel with the first direction or opposite to the first direction,
    a tilt hinge, by which the arm is connected to the chassis, so that the first end of the arm is arranged to be movable in a vertical direction in relation to the chassis when the transport device is on the horizontal surface,
    a carrier movably attached to the arm,
    an arm latch configured to lock the carrier to the arm,
    an apparatus configured to couple the interchangeable platform to the carrier,
    fastening equipment to fasten the interchangeable platform to one or more of the loading device, an unloading device or a combined loading and unloading device,
    at least one winch to move the fastening equipment in a direction of the arm forward and backward,
    a loading reel, a loading cable, an unloading reel, and an unloading cable wherein reeling the loading cable on to the loading reel is configured to pull the interchangeable platform on to the transport device and reeling the unloading cable to the unloading reel is configured to pull the interchangeable platform from the transport device,
    at least one roll to guide the interchangeable platform and/or the cable; in which case the transport device is arranged to pull the interchangeable platform to the transport device and unload the interchangeable platform from the transport device backwards by a turning arm and winch,
wherein
    the at least one roll is disposed behind the tilt hinge and attached to the arm,
    the interchangeable platform is configured to be lowered to the ground supported by the loading cable, and
    the arm is configured to turn, while loading of the interchangeable platform, so that a distance between the interchangeable platform from a vertical plane including a longitudinal direction of the arm gets smaller.

2. A transport device according to claim 1, wherein the transport device comprises one common loading and unloading device, in which case the count of the summed loading and unloading device is one, which loading and unloading device is arranged to pull the interchangeable platform to the transport device and unload the interchangeable platform from the transport device.

3. A transport device according to claim 1, wherein the transport device comprises:
    equipment to fasten the interchangeable platform to the transport device and
    wherein the equipment comprises a ball;

in which case the interchangeable platform, that can be connected to the transport device, can also be connected to other transport devices equipped with a ball.

4. A transport device according to claim 1, wherein the transport device comprises:
a balance spring, like a gas spring, by which the arm is arranged at an angle in reference to the chassis, when the arm is affected by vertical force momentum that is less than the limit set by the balance spring.

5. A transport device according to claim 1, wherein the carrier includes
a pusher, that is arranged to push the interchangeable platform off the roll.

6. A transport device according to claim 1, wherein the transport device comprises:
equipment to control the winch and
the winch is arranged to be controlled by information about at least one of the following:
an angle between the arm and the chassis,
mass of the load and
a momentum caused by the load and/or interchangeable platform and/or arm.

7. A transport device according to claim 1, wherein
the loading reel and the unloading reel are arranged to rotate together into the same direction around the rotation axle,
an unloading point of the loading cable at the loading reel is arranged to the first side of the rotation axle, and
an unloading point of the unloading cable at the unloading reel is arranged to the another side, opposite, in reference to the rotation axle;
in which case when the loading reel and the unloading reel are rotating, the first reel winds the cable to the first reel and the second reel unwinds the cable from the second reel.

8. A transport device according to claim 1, wherein the transport device encompasses
a one way clutch, that allows the loading reel to rotate freely in reference to the unloading reel only to a certain first direction, but when the loading reel rotates into another opposite direction, it transmits the loading reel momentum to the unloading reel,
which one way clutch is arranged in such a way, that while loading and while the loading reel is rotating, the momentum of the loading reel is not transmitted to the unloading reel;
in which case all of the winch momentum can be used to pull the interchangeable platform when loading.

9. A transport device according to claim 1, wherein the transport device comprises:
a friction clutch to slow down or to stop the rotation of the unloading reel, wherein the friction clutch is configured to affect the tension of the loading cable and the unloading cable.

10. A transport device according to claim 1, wherein the transport device is one of the following:
a trailer intended to be used behind a vehicle,
a trailer with fixed load carrying section intended to be used behind a vehicle,
a trailer with a load carrying section that can be tilted intended to be used behind a vehicle,
a vehicle with a fixed load carrying section, and
a vehicle with a load carrying section that can be tilted.

11. A transport device according to claim 1, wherein
the arm is directable such that, while unloading, the interchangeable platform is movable in the direction of the arm, wherein the direction forms an angle of at least 135 degrees with the first direction of the transport device.

12. A transport device according to claim 1, wherein the roll is arranged behind the tilt hinge.

13. A transport device according to claim 1, comprising a cross joint including the tilt hinge and the vertical hinge.

14. A transport device according to claim 1, wherein the apparatus configured to couple the interchangeable platform to the carrier comprises a latch and a limiter.

15. A transport device according to claim 1, wherein the apparatus configured to couple the interchangeable platform to the carrier is configured to lock the carrier to the arm to a location where a beam load to the transport device is matching.

16. A transport device according to claim 15, wherein the apparatus configured to couple the interchangeable platform to the carrier comprises a latch and a limiter.

* * * * *